(12) United States Patent
Miura et al.

(10) Patent No.: US 7,766,378 B2
(45) Date of Patent: Aug. 3, 2010

(54) HEAD-PROTECTING AIRBAG APPARATUS

(75) Inventors: Wataru Miura, Aichi-ken (JP); Yasuo Ochiai, Aichi-ken (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 524 days.

(21) Appl. No.: 11/819,554

(22) Filed: Jun. 28, 2007

(65) Prior Publication Data

US 2008/0007033 A1 Jan. 10, 2008

(30) Foreign Application Priority Data

Jul. 5, 2006 (JP) .............................. 2006-185788
Mar. 29, 2007 (JP) .............................. 2007-089303

(51) Int. Cl.
*B60R 21/16* (2006.01)
*B60R 21/20* (2006.01)

(52) U.S. Cl. ..................................... 280/730.2; 280/749
(58) Field of Classification Search .............. 280/730.2, 280/743.1, 749, 729
See application file for complete search history.

(56) References Cited

FOREIGN PATENT DOCUMENTS

| CN | 132 9998 | 1/2002 |
|---|---|---|
| CN | 162 1280 | 6/2005 |
| CN | 1751915 A | 3/2006 |
| JP | A-11-91490 | 4/1999 |
| JP | A-2000-33845 | 2/2000 |

OTHER PUBLICATIONS

Office Action mailed on Mar. 20, 2009 issued from the Chinese Patent Office for the corresponding Chinese patent application No. 200710122714X.
Office Action dated Oct. 10, 2008 in corresponding Chinese Patent Application No. 2007-10122714X.

*Primary Examiner*—Eric Culbreth
(74) *Attorney, Agent, or Firm*—Posz Law Group, PLC

(57) ABSTRACT

The airbag of the head-protecting airbag apparatus includes a rear inflatable portion deployed at the interior side of the rear pillar. The rear inflatable portion includes an upper side portion extending rearward from a gas feed passage disposed at the upper periphery of the airbag, a main body disposed below the upper side portion and partitioned from the upper side portion by a partitioning portion, and a branched portion extending downward from the gas feed passage. The main body inflates with inflation gas fed from an inlet opening disposed at the lower end of the branched portion. At least a front lower area of the upper side portion is located below a parting line between a rear pillar garnish and an airbag cover at full inflation of the airbag. The upper side portion and the gas feed passage are folded and housed at exterior side of the folded-up main body and branched portion such that the main body is pushed out toward an interior of the vehicle getting over the upper end of the rear pillar garnish by the upper side portion and the gas feed passage.

5 Claims, 22 Drawing Sheets

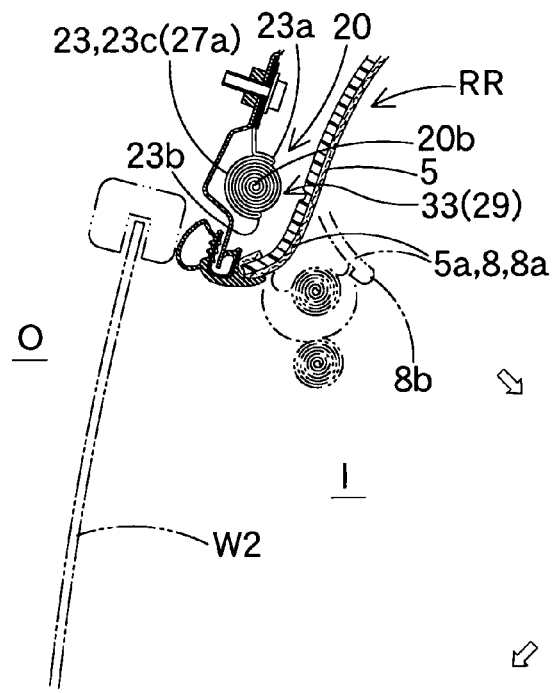
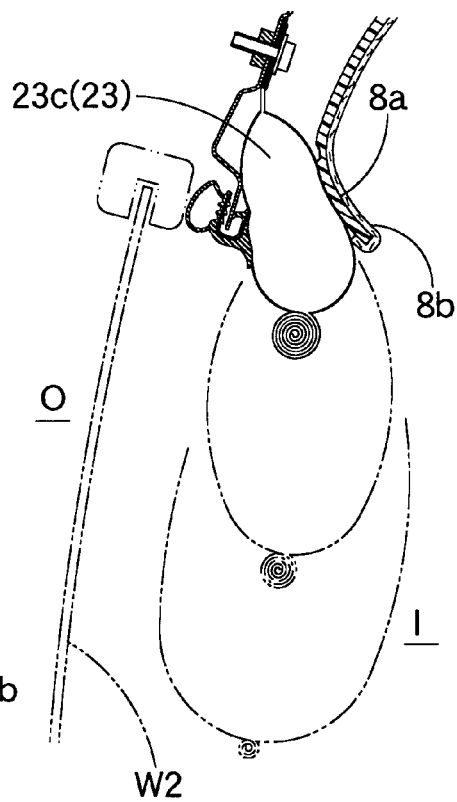
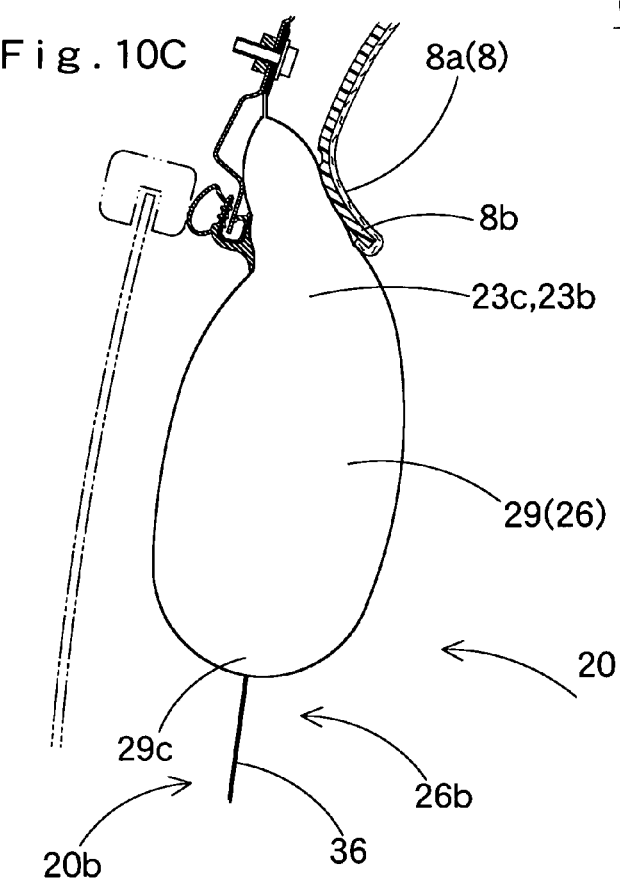

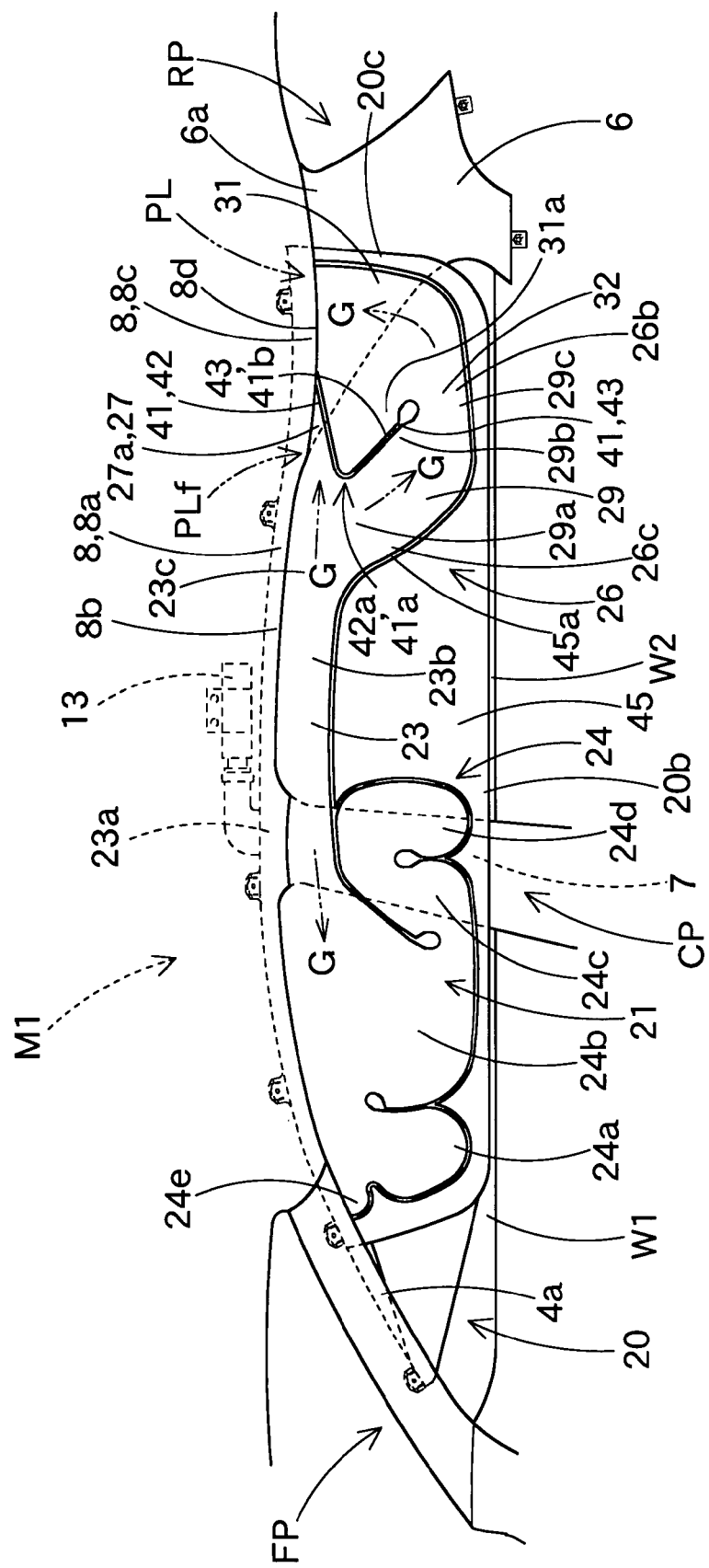

HEAD-PROTECTING AIRBAG APPARATUS

The present application claims priorities from Japanese Patent Application No. 2006-185788 of Miura et al., filed on Jul. 5, 2006 and Japanese Patent Application No. 2007-089303 of Miura et al., filed on Mar. 29, 2007, the disclosures of which are hereby incorporated into the present application by reference.

BACKGROUND OF THE INVENTION

1. Field of the Invention

The present invention relates to ahead-protecting airbag apparatus including an airbag which, when fed with inflation gas, is deployable downward from an upper periphery of side windows of a vehicle to protect occupants' heads.

2. Description of Related Art

In the prior art, Japanese Patent Laid-Open No. 11-91490 and Japanese Patent Laid-Open No. 2000-33845 are illustrative of head-protecting airbag apparatuses including airbags which are folded and housed in the upper peripheral area of windows of a vehicle inclusive of upper areas of pillars, while being covered by an airbag cover. When fed with inflation gas, each of these airbags pushes and opens the airbag cover and deploy downward from the upper peripheral area of the windows to cover interior sides of the pillars and windows. These airbag apparatuses are provided with a jump stand and/or a guide plate that prevents a deploying airbag from entering into an exterior space of a pillar garnish covering the inner side of the pillar, such that the airbags smoothly deploy toward the interior of vehicle.

The jump stand is disposed above, and at outer side of, the pillar garnish, and includes a slanted guide face, on its top surface. The jump stand serves to guide the airbag to deploy toward the interior of vehicle without contacting an upper end of the pillar garnish but overpassing the upper end of the pillar garnish, by having the airbag slide on its guide face.

The guide plate is coupled to the jump stand and mounted around the folded airbag. Upon airbag deployment, the guide plate also deploys in such a manner as to block up the exterior space of the upper end of the pillar garnish.

However, the jump stand is made of rigid material so they guide the deployment direction of the airbag securely, which can increase the weight of the apparatus by the use of metal such as plate metal. On the other hand, if the jump stand is made of synthetic resin for lightweight solution, the jump stand will require a rib for reinforcement, which will result in a bulkiness of the jump stand.

Especially when the airbag is designed to cover the interior side of the rear pillar, since a rear pillar garnish has a wide width at its upper end in the longitudinal direction, a jump stand disposed at the rear pillar must be designed elongative in accordance with the dimension of the rear pillar garnish. Therefore, above problems of weight increase and bulkiness are enhanced.

SUMMARY OF THE INVENTION

The present invention contemplates to solve the above-mentioned problem, and therefore, has an object to provide a head-protecting airbag apparatus capable of deploying its airbag toward the interior of vehicle smoothly from the vicinity of the upper end of the pillar garnish at the rear pillar with a simple structure.

The head-protecting airbag apparatus of the present invention includes an airbag folded and housed in an upper periphery of a window inside a vehicle. The airbag pushes and opens an airbag cover and deploys downward to cover the window when fed with inflation gas. The vehicle includes a rear pillar and a window adjoining the rear pillar in front of the rear pillar. The airbag is attached to a vehicle body at its upper edge, and includes a rear inflatable portion and a gas feed passage. The rear inflatable portion is disposed at a rear area of the airbag. The rear inflatable portion is housed in the vicinity of an upper area of the rear pillar and gets over an upper end of a pillar garnish covering an interior side of the rear pillar while pushing and opening the airbag cover, and deploys to cover interior sides of the rear pillar and the window adjoining the rear pillar in front of the rear pillar at full inflation of the airbag. The gas feed passage is arranged along the longitudinal direction of the vehicle at an upper edge of the airbag in front of the rear inflatable portion and supplies inflation gas to a rear region of the airbag. The rear inflatable portion includes an upper side portion, a partitioning portion, a main body and a branched portion. The upper side portion extends from the gas feed passage to a rear end of the airbag along the longitudinal direction at an upper edge region of the rear inflatable portion. The partitioning portion extends continuously forward from a rear edge of the airbag for partitioning the upper side portion and a region of the rear inflatable portion disposed below the upper side portion, i.e., the main body. The main body is disposed below the upper side portion by being partitioned from the upper side portion by the partitioning portion. The main body deploys to cover the interior sides of the rear pillar and the window adjoining the rear pillar in front of the rear pillar. The branched portion is disposed in a region from a front edge to a lower edge of the rear inflatable portion and in front of the main body. The branched portion is deployed in front of the rear pillar and below a lower edge of the airbag cover disposed on the upper periphery of the window adjoining the rear pillar in front of the rear pillar at full inflation of the airbag. The branched portion includes an opening for admitting inflation gas flowing downward from the gas feed passage at the front of a front end of the partitioning portion and below a rear end of the gas feed passage. The main body is formed to admit inflation gas from an inlet opening disposed at a rear edge of the branched portion, between a front end area of the partitioning portion and a lower edge of the airbag in the lower edge of the rear inflatable portion. When the airbag is fully inflated, a whole lower edge, or a part of a front end area of the lower edge, of the upper side portion is located below a parting line between the upper end of the pillar garnish and the lower edge of the airbag cover on a vehicle cabin side before the airbag cover is opened. Further, the upper side portion and the gas feed passage are folded and housed at exterior side of the folded-up main body and branched portion such that the main body is pushed out toward an interior of the vehicle getting over the upper end of the pillar garnish by the upper side portion and the gas feed passage upon airbag inflation.

If inflation gas flows into the airbag folded and housed on the upper periphery of the window, in the rear inflatable portion, the gas feed passage disposed along the longitudinal direction and the upper side portion arranged to follow the feed passage along the longitudinal direction inflate swiftly from the front to the rear and push out the main body and branched portion disposed therebelow toward the interior of vehicle. Hence the main body hurdles the upper end of the pillar garnish and deploys to cover the interior sides of the rear pillar and the window adjoining the rear pillar in front of the pillar together with the branched portion.

When the upper side portion inflates from the front end to the rear end and completes inflation, at least the front end region proximate the lower edge of the upper side portion is located below the parting line between the upper end of the pillar garnish and the lower edge of the airbag cover seen from the interior of vehicle before the air bag cover is opened. Hence at least the front end region of the upper side portion is located at the inner side of the upper end of the pillar garnish, so that the upper side portion serves like a chock or wedge disposed between the inner side of the upper end of the pillar garnish and the outer side of the lower edge of the airbag cover disposed above the rear pillar. The upper side portion further opens the airbag cover toward the interior and keeps the open state. At this time, if the whole lower edge region of the upper side portion is formed to be deployed below the parting line between the upper end of the pillar garnish and the lower edge of the airbag cover seen from the interior of vehicle before the airbag cover is opened at full inflation of the airbag, the upper side portion conduces to open the airbag cover toward the interior over a wide range in the longitudinal direction above the rear pillar when inflated.

The branched portion pushed out toward the interior by inflation of the upper side portion and the gas feed passage is disposed in an area from the front edge to the lower edge of the rear inflatable portion. The branched portion is formed to admit downward gas from the opening disposed in front of the front end of the partitioning portion and below the rear end of the gas feed passage. Hence the branched portion inflates in such a manner as to extend downward along the interior side of the window. Further, the branched potion is formed to be deployed in front of the rear pillar and below the lower edge of the region of the airbag cover disposed on the upper periphery of the window adjoining the rear pillar in front of the rear pillar at full inflation of the airbag. Accordingly, the branched portion inflates in such a stable manner as to extend downward along the interior side of the window without oscillating inward or outward by engaging the rear pillar or the like.

Moreover, the upper side portion disposed above the main body is closed at its rear end by the partitioning portion extending from the rear edge of the airbag and therefore, the upper side portion is not in communication with the main body. Hence the main body admits inflation gas only from the inlet opening formed between the front end area of the partitioning portion proximate the rear edge of the branched portion and the lower edge of the airbag. Further, the branched portion inflates in such a stable manner as to extend downward along the interior side of the window. Accordingly, the main body inflates with its front edge region supported along the vertical direction by the branched portion. Moreover, by the time the main body inflates with inflation gas fed from the inlet opening, the upper side portion has completed inflation and is located like a wedge above the rear pillar and keeps the airbag cover opened. As a result, the main body is firstly pushed out toward the interior by the inflation of the upper side portion and the gas feed passage and deploys to cover the interior sides of the rear pillar and the window adjoining the rear pillar in front of the pillar. Then the main body inflates and increases its thickness while covering the interior sides of the rear pillar garnish and the window adjoining the garnish below the airbag cover opened above the rear pillar by the upper side portion, without projecting toward the interior unduly, and then completes inflation.

Therefore, with the head-protecting airbag apparatus of the present invention, the airbag smoothly deploys toward the interior from the vicinity of the upper end of the pillar garnish by simple structures of the airbag itself such as the adjustment of locations of respective inflatable chambers of the airbag at the folding and housing or the adjustment of locations of the respective inflatable chambers with respect to the rear pillar and the airbag cover. Furthermore, with the apparatus of the invention, the main body deploys in a stable manner without wobbling inward or outward.

The upper side portion of the airbag may have a uniform inner diameter generally all along its longitudinal length at full inflation, or alternatively, it may be formed so that its inner diameter is gradually reduced from the front side toward the rear side at full inflation. If the upper side portion has a uniform inner diameter generally all along its longitudinal length at full inflation, the airbag cover is wide opened toward the interior by the upper side portion over a wide range in the longitudinal direction above the rear pillar. In this case, accordingly, the manner the main body deploys is further stabilized. On the other hand, if the upper side portion is so designed that its inner diameter is gradually reduced from the front side to the rear side at full inflation, the area the airbag cover is opened wide toward the interior becomes less. In this case however, the upper side portion comes to have a reduced volume and this allows a greater volume of the main body. Consequently, a protection area of the main body is enlarged.

It is desired that the partitioning portion partitioning the upper side portion and the main body includes a transverse portion extending forward from the rear edge of the airbag and a vertical portion extending downward from a front end of the transverse portion and serving as the front end area of the partitioning portion, the branched portion is comprised of a region of the rear inflatable portion disposed in front of the vertical portion, and that the inlet opening of the main body is formed between a lower end of the vertical portion and the lower edge of the airbag.

With this structure, when the branched portion admits inflation gas from the opening disposed below the rear end of the gas feed passage, the inflation gas flows through the branched portion downward smoothly between the front edge of the rear inflatable portion and the vertical portion disposed at the front end of the partitioning portion. Hence the branched portion further stably inflates in a rod shape extending downward along the interior side of the window without wobbling inward or outward by engaging the rear pillar or the like. As a result, the main body is further supported along the vertical direction upon inflation by the branched portion. On the other hand, the main body admits inflation gas via the inlet opening disposed at the lower end of the rear edge of the branched portion and which gas flows rearward and then upward. Thus the main body inflates from the lower edge region of the rear inflatable portion toward the upper edge of the rear inflatable portion proximate the upper side portion which has completed inflation and is in a generally stationary state. That is, the main body inflates from the lower end region of the branched potion toward the upper side portion in a state where it is supported at its front side and top side by the branched portion and the upper side portion both having fully inflated and being in settled postures. Therefore, the main body deploys in a further stable manner without wobbling inward or outward.

A region of the partitioning portion extending continuously forward from the rear edge of the airbag may be formed to be deployed below and along the parting line at full inflation of the airbag. With this structure, the whole lower edge of the upper side portion is deployed to extend along and below the parting line at full inflation of the airbag, which helps open the airbag cover wide toward the interior over a wide range in the longitudinal direction above the rear pillar. Additionally, the whole main body is smoothly projected toward the interior from the vicinity of the parting line upon inflation of the upper side portion.

BRIEF DESCRIPTION OF DRAWINGS

FIGS. 10A, 10B and 10C are schematic sections of the airbag apparatus of FIG. 1 taken along line X-X of FIGS. 1 and 2, illustrating the behavior of the apparatus in operation at the vicinity of the rear end of the gas feed passage in order;

FIG. 11 is a schematic front view of the airbag apparatus of FIG. 1 having completed operation;

DESCRIPTION OF PREFERRED EMBODIMENTS

Preferred embodiments of the present invention are described below with reference to the accompanying drawings. However, the invention is not limited to the embodiments disclosed herein. All modifications within the appended claims and equivalents relative thereto are intended to be encompassed in the scope of the claims.

Figure 1:
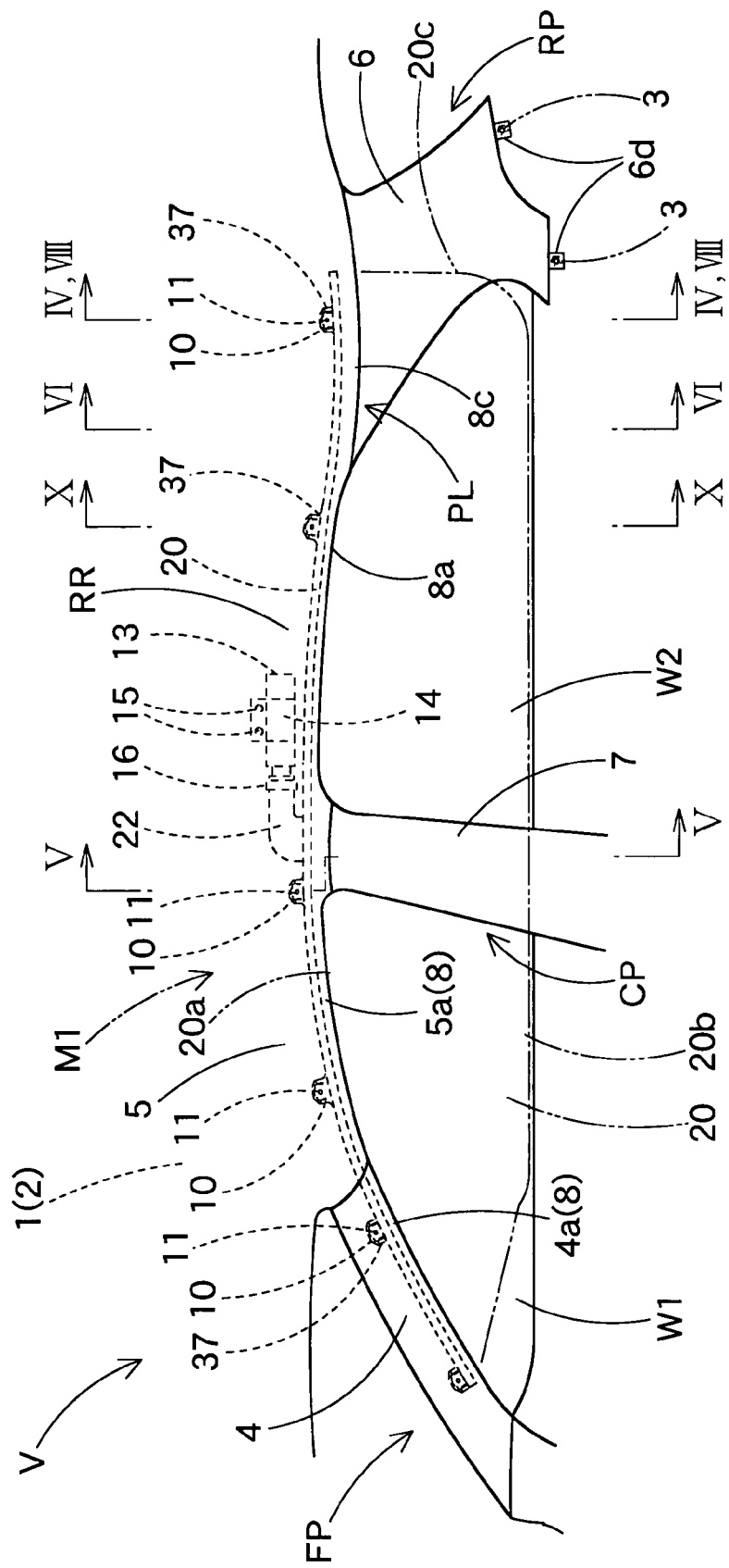
FIG. 1 is a schematic front view of a head-protecting airbag apparatus according to the first embodiment of the present invention, as is mounted on a vehicle.

As shown in FIG. 1, a head-protecting airbag apparatus M1 according to the first embodiment of the invention includes an airbag 20, an inflator 13, mounting brackets 10 and 14, and an airbag cover 8. The airbag 20 is folded and housed along the upper edge of side windows W1 and W2 inside the vehicle V, in a range from a lower edge part of a front pillar FP to an upper part of a rear pillar RP, via a lower edge of a roof side rail RR.

As shown in FIG. 1, the inflator 13 has a substantially columnar or cylindrical contour. The inflator 13 is sheathed with a joint port 22 of the airbag 20 serving as an inlet of inflation gas, and connected with the airbag 20 by a clamp 16 clinched from the outside of the joint port 22. The inflator 13 is secured to an inner panel 2 by a mounting bracket 14 at the roof side rail RR in the vicinity of and above the center pillar CP while being covered by a lower edge 5a of a roof head lining 5. The inner panel 2 is a component of the vehicle body structure 1. The mounting bracket 14 is made of sheet metal, and is secured to the inner panel 2 by bolts 15 while holding the inflator 13.

Figure 4:
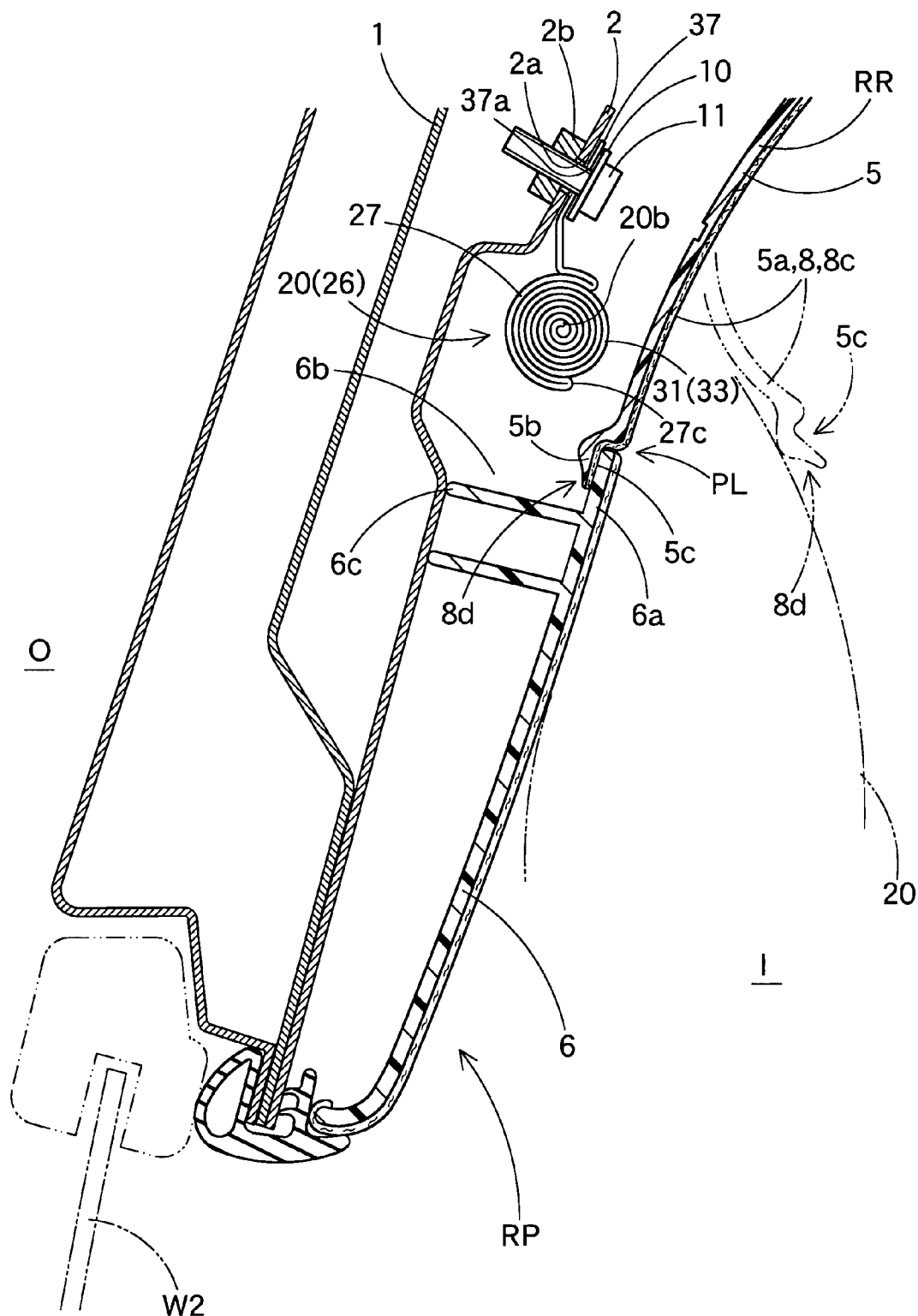
FIG. 4 is a schematic vertical section of the airbag apparatus of FIG. 1 taken along line IV-IV of FIG. 1.
Figure 5:
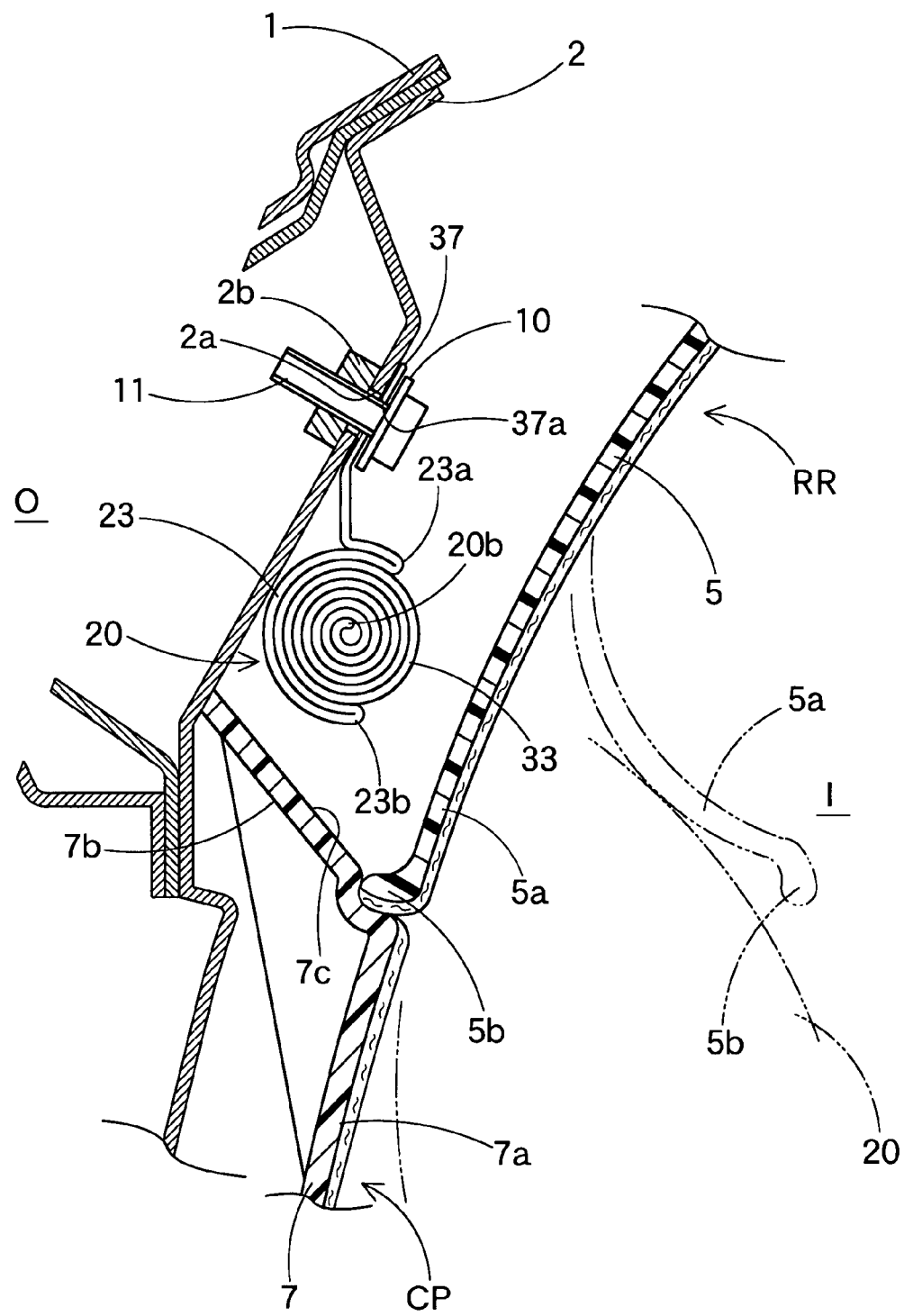
FIG. 5 is a schematic vertical section of the airbag apparatus of FIG. 1 taken along line V-V of FIG. 1.

As shown in FIGS. 4 and 5, each of the mounting brackets 10 attaches each of later-described mounting portions 37 of the airbag 20 to the inner panel 2 by a bolt 11. The bolts 11 are fastened into mounting holes 2a formed on the inner panel 2 with nuts 2b.

Figure 2:
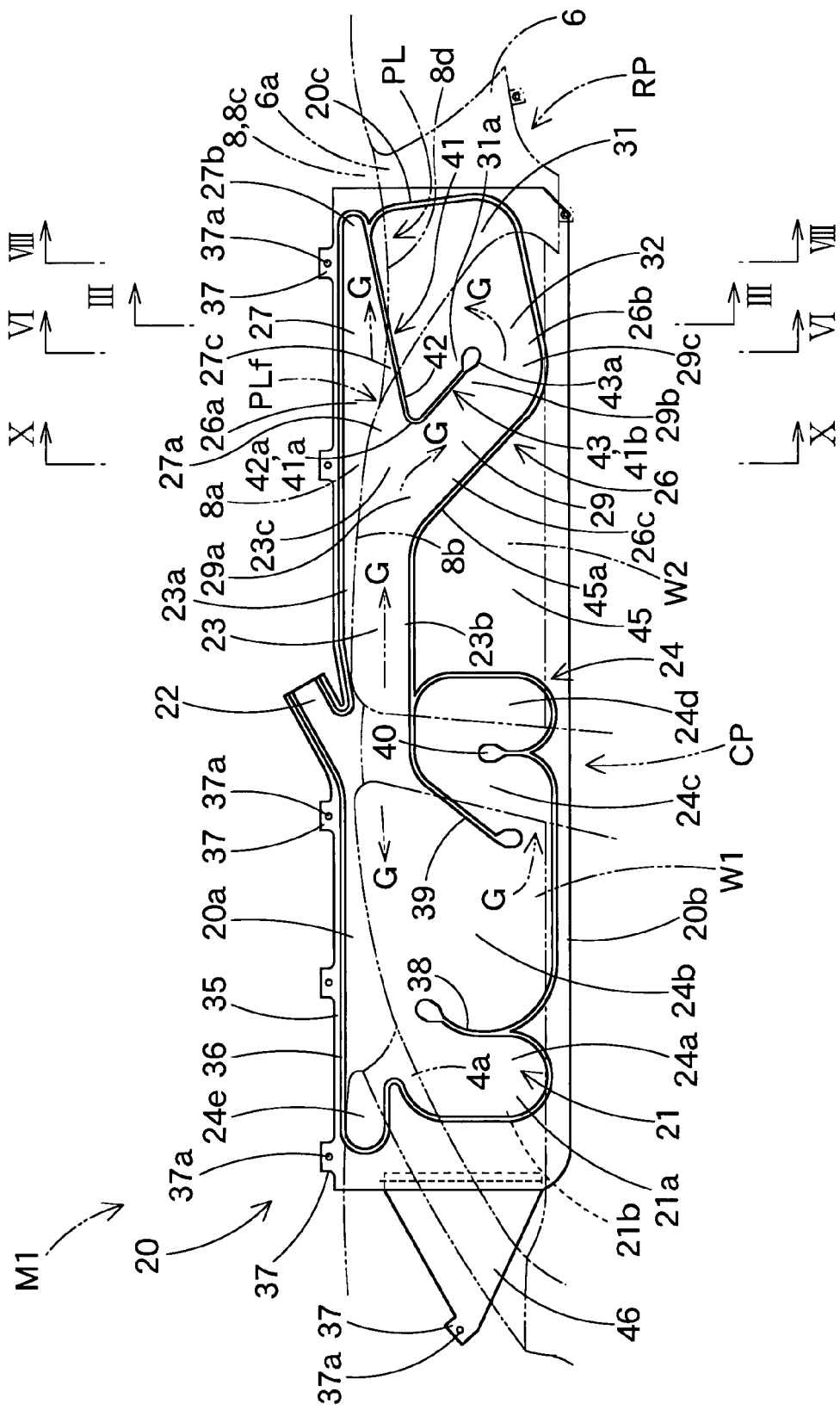
FIG. 2 is a front view of an airbag used in the apparatus of FIG. 1.

The airbag cover 8 is comprised of a lower edge 4a of a front pillar garnish 4 arranged at the front pillar FP and a lower edge 5a of the roof head lining 5 arranged at the roof side rail RR. The front pillar garnish 4 and the roof head lining 5 are made from synthetic resin, and are secured to the interior side of the inner panel 2 at the front pillar FP and the roof side rail RR, respectively. The roof head lining 5 is arranged from the upper part of the front pillar FP to the upper part of the rear pillar RP, via the upper part of the center pillar CP. The airbag cover 8 includes, at the vicinity of a rear side window W2, a window side portion 8a disposed at the upper edge of side window W2 and a pillar side portion 8c disposed at the upper end of the rear pillar RP (FIGS. 2 and 11).

There are disposed a rear pillar garnish 6 and a center pillar garnish 7 made from synthetic resin at the interior sides of the rear pillar RP and the center pillar CP. As shown in FIG. 5, the center pillar garnish 7 includes a support rib 7b extending toward the exterior O from its upper end 7a and abutting against, and therefore being supported by, the inner panel 2. The support rib 7b also serves as a jump platform. Specifically, a top plane of the support rib 7b serves as a guide ramp 7c guiding the airbag 20 to deploy toward the interior I without being hitched by the upper end 7a. The center pillar 7 is attached to the inner panel 2 by bolt-fixing in a state where the upper end 7a is inserted to the exterior O of the lower edge 5a of the roof head lining 5 until the support rib 7b abuts against the inner panel 2 whereas an unillustrated lower end region of the center pillar 7 is moved toward the exterior O. On the other hand, as shown in FIG. 4, the rear pillar garnish 6 is provided with a support rib 6c at its exterior side O. The support rib 6c projects toward the exterior O from a position come down from an upper end 6a of the garnish 6 to abut against, and therefore be supported by, the inner panel 2. A recessed area 6b is formed between the upper end 6a and the support rib 6c. When mounting the pillar garnish 6 on a vehicle, mounting portions 6d (FIG. 1) disposed at the lower end of the pillar garnish 6 are firstly bolt 3 fixed to the inner panel 2, and then the upper end 6a area is pressed toward the inner panel 2, i.e. toward the exterior O so that the upper end 6a fits in a recess 5b formed at the lower end 5b of the roof head lining 5. With this arrangement, in order that the support rib 6c does not engage the lower end 5b of the roof head lining 5, a jump platform cannot be formed at the upper end 6a of the exterior side O of the rear pillar garnish 6. Therefore, the recessed area 6b is provided.

Figure 3:
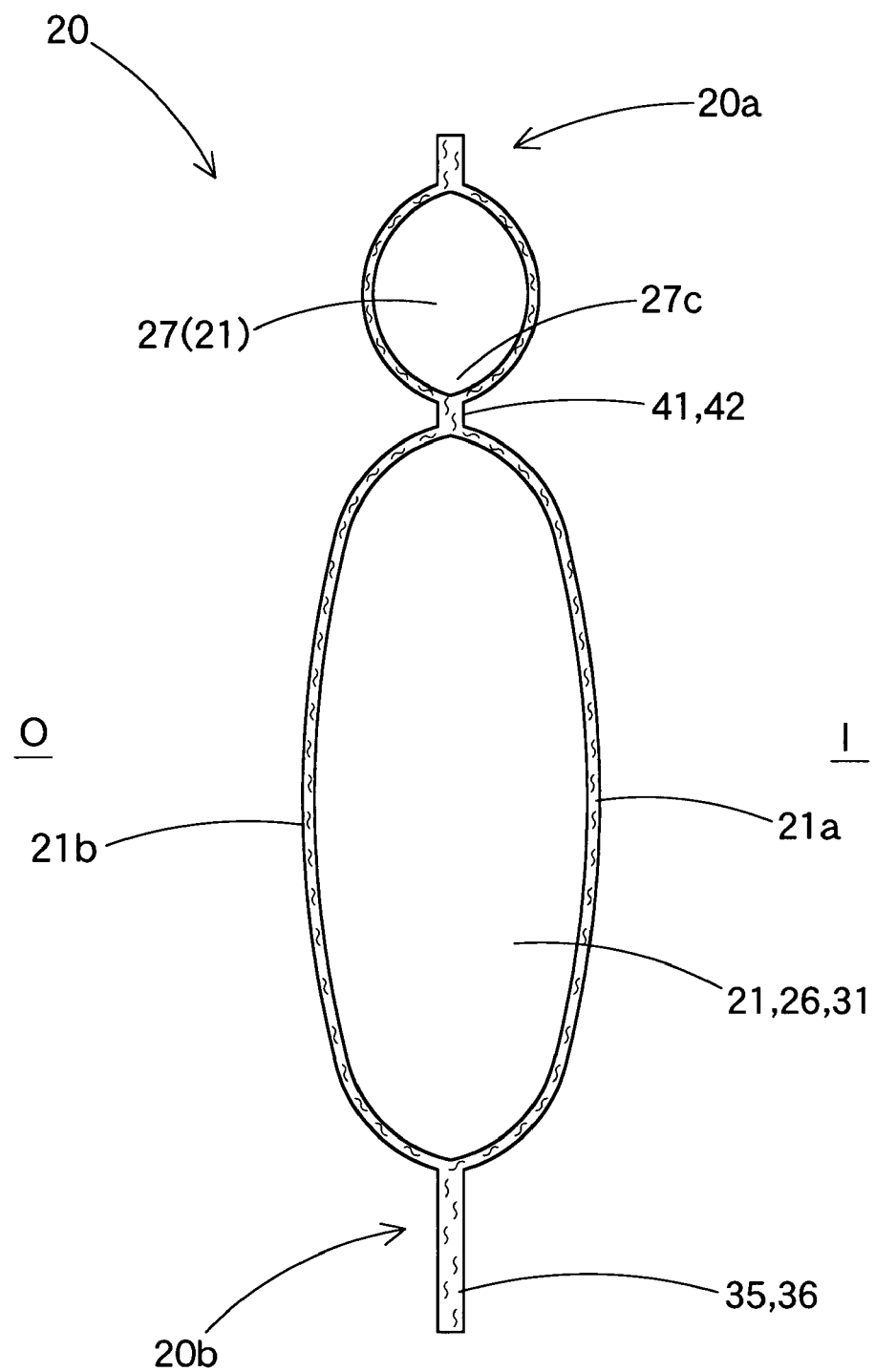
FIG. 3 is a schematic section of the airbag of FIG. 2 in an inflated state taken along line III-III of FIG. 2.

As shown in FIGS. 1, 4, 5 and 11, when fed with inflation gas G from the inflator 13, the airbag 20 is developed from the folded state and deploys to cover interior sides of side windows W1, W2, the pillar garnishes 7 and 6 of the center pillar CP and the rear pillar RP. As shown in FIGS. 2 and 3, the airbag 20 includes a gas admissive portion 21 inflatable with inflation gas G in such a manner as to separate its inner wall 21a and outer wall 21b, and a non-admissive portion 35 which has a structure where the inner wall 21a and outer wall 21b are joined together and admits no inflation gas G. This airbag 20 is manufactured by hollow-weaving method using polyamide yarn, polyester yarn or the like, except a triangular panel portion 46 disposed at the front end. The panel portion 46 is coupled to the front end of the airbag 20 by sewing or the like. In this specific embodiment, the airbag 20 includes a front inflatable portion 24 to be inflated at an area of a side window W1 located at a side of a front seat and the center pillar CP, and a rear inflatable portion 26 to be inflated at an area of the side window W2 located at a side of a rear seat and the rear pillar RP.

The non-admissive portion 35 includes a peripheral portion 36, mounting portions 37, partitioning portions 38, 39, 40 and 41, and panel portions 45 and 46. The peripheral portion 36 is arranged to encompass the gas admissive portion 21.

Each of the mounting portions 37 projects upward from the peripheral portion 36 in the upper edge 20a of the airbag 20. The airbag 20 includes more than one mounting portion 37 and includes six mounting portions 37 in the illustrated embodiment. Each of the mounting portions 37 is provided with a mounting hole 37a to receive the bolt 11 (FIGS. 4 and 5). As described above, the mounting bracket 10 is attached to each of the mounting portions 37, and the bolts 11 are put through the mounting holes 37a and fastened into the nuts 2b, thereby attaching the airbag 20 to the inner panel 2.

The panel portion 45 has a rectangular panel shape and is located between the front and rear inflatable portions 24 and 26 below a later-described gas feed passage 23, in such a manner as to extend upward from the lower edge 20b of the airbag 20. A rear edge 45a of the panel portion 45 extends generally vertically and borders a front edge 26c of the rear inflatable portion 26. The panel portion 45 serves to secure an entire contour of the airbag 20, and also serves to shorten the time period required to complete inflation of the airbag 20 by reducing the volume of the gas admissive portion 21. The panel portion 46 is formed of woven fabric of polyester or the like, and is coupled to the front end of the airbag 20 by sewing or the like. The mounting portion 37 is formed on the front end of the panel portion 46, too.

The partitioning portions 38 to 41 are formed to extend from the peripheral portion 36 to enter into the front and rear inflatable portions 24 and 26. The partitioning portions 38 to 41 serve to control the flow of inflation gas G as well as regulate the thickness of the airbag 20 upon inflation so the airbag 20 is inflated into a plate-like contour. The partitioning portions 38 to 40 disposed inside the front inflatable portion 24 split up the inflatable portion 24 into a plurality of (four, in the illustrated embodiment) cells 24a, 24b, 24c and 24d disposed side by side along the longitudinal direction.

The partitioning portion 41 disposed inside the rear inflatable portion 26 is formed into a L shape including a transverse portion 42 and a vertical portion 43. The transverse portion 42 extends continuously forward from the rear edge 20c of the airbag 20. The vertical portion 43 extends obliquely rearward and downward from the front end 42a of the transverse portion 42 which front end 42a is equal to the front end 41a of the partitioning portion 41. The vertical portion 43 also constitutes the front end area 41b of the partitioning portion 41.

In the foregoing embodiment, the gas admissive portion 21 includes a joint port 22, a gas feed passage 23, the front inflatable portion 24 and the rear inflatable portion 26. The gas feed passage 23 is arranged straightly along the longitudinal direction of vehicle V at the upper edge 20a area of the airbag 20, in such a manner as to communicate the front and rear inflatable portions 24 and 26 above the panel portion 45. The joint port 22 extends upward from a longitudinal middle position of the upper edge 20a of the airbag 20 to be connected to the inflator 13 for introducing inflation gas G from the inflator 13 into the gas admissive portion 21. The joint port 22 is internally provided with an unillustrated flow regulating cloth. The flow regulating cloth is arranged to be inserted into the gas feed passage 23 for diverging inflation gas G supplied from the inflator 13 toward the front and rear so the inflation gas G flows toward both front and rear in the gas feed passage 23.

The gas feed passage 23 is designed so that the upper edge 23a area is covered by the airbag cover 8 whereas the lower edge 23b area projects downward from the airbag cover 8 when the airbag mounted on the vehicle is fully inflated (FIG. 11).

As shown in FIGS. 2 and 11, the front inflatable portion 24 of the gas admissive portion 21 of the airbag 20 is designed to deploy at the vehicle's interior area I of the side window W1 and the center pillar CP. Moreover, the front inflatable portion 24 includes four cells 24a, 24b, 24c and 24d disposed side by side along the longitudinal direction, which cells are provided by being partitioned by the three partitioning portions 38-40. Upper ends of the cells 24a and 24b are on a front-side extension of the gas feed passage 23. The cells 24c and 24d are designed to admit inflation gas G from the lower end of the cell 24b. The front inflatable portion 24 is further provided at its front upper end with a cell 24e projecting forward. The cell 24e helps open the lower edge 4a of the front pillar garnish 4 smoothly.

As shown in FIGS. 2 and 11, the rear inflatable portion 26 includes an upper side portion 27, a branched portion 29 and a main body 31 provided by being partitioned by the partitioning portion 41. The upper side portion 27 extends from the gas feed passage 23 to the rear end or rear edge 20c of the airbag 20 along the longitudinal direction at an upper edge 26a region of the rear inflatable portion 26. In the foregoing embodiment, a part of a front end 27a of a lower edge 27c of the upper side portion 27 is located below a parting line PL between the upper end 6a of the rear pillar garnish 6 and the lower edge 8d of the airbag cover 8 seen from a vehicle cabin before the airbag cover 8 is opened, at complete inflation of the airbag 20 (FIG. 11). Although FIG. 2 illustrates the relationship of outlines of the airbag cover 8 and rear pillar garnish 6 shown by phantom lines and a region of the airbag 20 at the vicinity of the parting line PL (i.e., the vicinity of the lower edge 27c of the upper side portion 27) in a developed but uninflated state with accuracy, the relationship is not necessarily accurate with respect to other regions of the airbag 20. In the foregoing embodiment, moreover, the front end 42a of the transverse portion 42 of the partitioning portion 41 is located forward of a front end PLf of the parting line PL. Additionally, in order that the inflation gas G flows to the rear end 27b from the front end 27a of the upper side portion 27 in a stable manner, the joint port 22 is located forward of the front end 42a of the transverse portion 42 of the partitioning portion 41.

The main body 31 is partitioned from the upper side portion 27 by the partitioning portion 41 extending continuously forward from the rear edge 20c of the airbag 20, and is disposed below the upper side portion 27. The main body 31 is adapted to inflate to cover the interior sides of the rear pillar RP and the side window W2 adjoining the rear pillar RP in front of the rear pillar RP.

The branched portion 29 is disposed in a region from the front edge 26c to the lower edge 26b of the rear inflatable portion 26 and in front of the main body 31. It is branched off downward from the rear end 23c of the gas feed passage 23. That is, in the foregoing embodiment, the branched portion 29 is located between the vertical portion 43 of the partitioning portion 41 and the rear edge 45a of the panel portion 45. At the complete inflation of the airbag 20, the branched portion 29 is deployed in front of the rear pillar RP and below the lower edge 8b of the window side portion 8a of the airbag cover 8 disposed on the upper periphery of the side window W2 adjoining the rear pillar RP in front of the rear pillar RP (FIGS. 2 and 11). The branched portion 29 includes an opening 29a for admitting inflation gas G flowing downward from the gas feed passage 23 at the front of the front end 41a of the partitioning portion 41 and below the rear end 23c of the gas feed passage 23. To describe the opening 29a more specifically, it is disposed between the front end 41a of the partitioning portion 41 and the rear edge 45a of the panel portion 45 of the non-admissive portion 35 which equals to the front edge 26c of the rear inflatable portion 26. Moreover, at the rear edge 29b of the branched portion 29 is an inlet opening 32 for supplying inflation gas G to the main body 31. The inlet opening 32 is disposed between the front end area 41b of the partitioning portion 41 and the lower edge 26b of the rear inflatable portion 26 or the lower edge 20b of the airbag 20. In the foregoing embodiment, the lower end 43a of the vertical portion 43 of the partitioning portion 41 is located apart from and above the peripheral portion 36 disposed at the lower edge 20b of the airbag 20 or the lower edge 26b of the rear inflatable portion 26. Therefore, the inlet opening 32 is located at the lower end 29c of the rear edge 29b of the branched portion 29, i.e., at the lower edge 26b of the rear inflatable portion 26. At the complete inflation, the branched portion 29 is deployed along the front edge of the rear pillar garnish 6 within the vehicle's interior area of the side window W2 in such a manner as to be oriented rearward and downward from the rear end 23c of the gas feed passage 23, which serves as the upper end of the branched portion 29, to the inlet opening 32 which serves as the lower end of the branched portion 29 (FIGS. 10C and 11).

To manufacture the airbag 20, the airbag 20 is formed by hollow-weaving method, and the panel portion 46 is joined to the front edge of the airbag 20 by sewing or the like. If then the flow regulating cloth is disposed inside the joint port 22, the airbag 20 is completed.

The airbag 20 is folded up in the following manner before being mounted on a vehicle: the airbag 20 is folded in such a manner as to bring the lower edge 20b close to the upper edge 20a provided with the mounting portions 37. At this time, the upper side portion 27 and the gas feed passage 23 are folded and located at the exterior side O of the folded-up main body 31 and branched portion 29 so that the main body 31 is pushed out toward the interior I of vehicle getting over the upper end 6a of the rear pillar garnish 6 upon airbag deployment. In the first embodiment, as shown in FIGS. 4 and 5, the lower edge 20b region of the airbag 20 is rolled toward the exterior O, and then rolled toward the opposite direction in the vicinity of the gas feed passage 23 and upper side portion 27. In other words, the vicinity of the gas feed passage 23 and upper side portion 27 are located at the exterior side O of the rolled region 33 of the lower edge 20b region and rolled to complete the folding of the airbag 20. That is, the vicinity of the gas feed passage 23 and upper side portion 27 are located at the exterior side O of the main body 31 and the branched portion 29 (FIG. 10A) when folding up the airbag 20. At this time, the front inflatable portion 24 is also folded up on the same creases and with the same folding width as those of the rear inflatable portion 26.

When the airbag 20 is folded up, an unillustrated breakable wrapping member is wound around the airbag 20 for keeping the folded-up configuration. Subsequently, the mounting bracket 14 is attached to the inflator 13 and this inflator 13 is coupled with the joint port 22 of the airbag 20 by a clamp 16. If then the mounting brackets 10 are attached to the mounting portions 37 of the airbag 20, an airbag module is assembled.

By then locating the mounting brackets 10 and 14 at predetermined positions of the inner panel 2, and fixing them to the inner panel 2 with bolts 11 and 15 put through the mounting holes 37a, the airbag module is mounted on the vehicle body 1. Subsequently, a not-shown lead wire extending from a predetermined control device for activating the inflator is connected to the inflator 13. If the front pillar garnish 4, the roof head lining 5, and further the rear pillar garnish 6 and the center pillar garnish 7 are attached to the vehicle body 1, the head-protecting airbag device M1 is mounted on the vehicle V.

When the inflator 13 is actuated after the airbag device M1 is mounted on the vehicle V, inflation gas G discharged from the inflator 13 flows into the gas feed passage 23 of the airbag 20 via the joint port 22 as indicated by phantom lines in FIG. 2. Inflation gas G then flows through the gas feed passage 23 toward the front and rear and enters each of the front inflatable portion 24 and rear inflatable portion 26. Then the front inflatable portion 24 and rear inflatable portion 26 break the wrapping member having been wound around the airbag 20, push and open the airbag cover 8 disposed on the lower edges 4a and 5a of the front pillar garnish 4 and the roof head lining 5, and deploy downward to cover the inner sides I of the side windows W1, W2, the center pillar CP, and the rear pillar RP as indicated by double-dotted lines in FIG. 1.

In the initial stage of airbag deployment, in the rear inflatable portion 26, the gas feed passage 23 disposed along the longitudinal direction and the upper side portion 27 arranged to follow the feed passage 23 along the longitudinal direction inflate swiftly from the front to the rear. Hence the main body 31 and branched portion 29 disposed below the gas feed passage 23 and the upper side portion 27 are pushed out toward the interior I as shown in FIGS. 6A, 6B, 10A and 10B. The main body 31 further hurdles the upper end 6a of the rear pillar garnish 6 and deploys to cover the interior sides I of the rear pillar RP and the side window W2 adjoining the rear pillar RP in front of the pillar RP together with the branched portion 29.

Figure 6A:
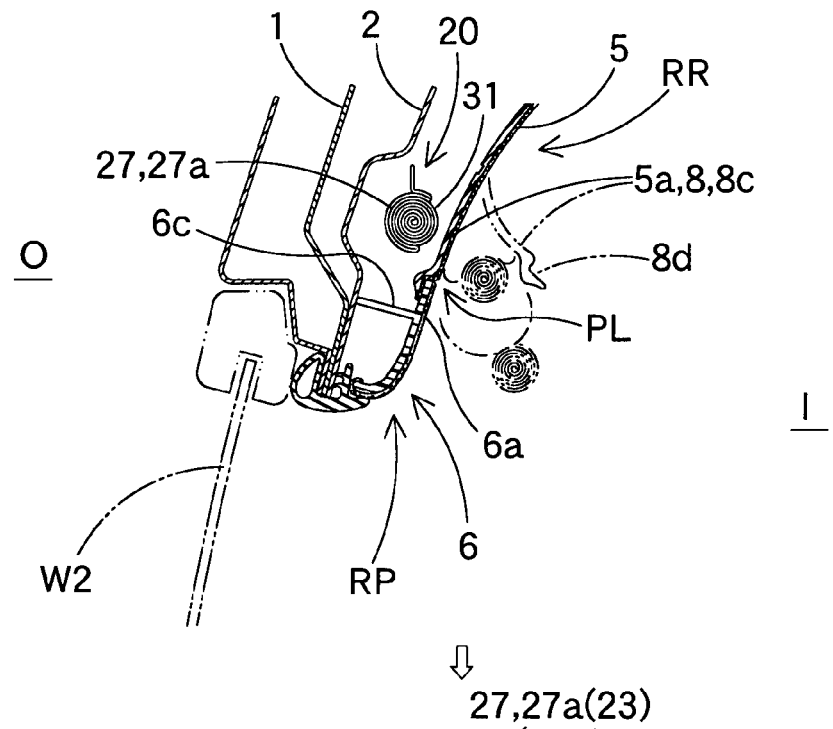
FIGS. 6A, 6B, 7A and 7B are schematic sections of the airbag apparatus of FIG. 1 taken along line VI-VI of FIGS. 1 and 2, illustrating behavior of the apparatus in operation at the vicinity of the front end of the upper side portion in order.
Figure 6B:
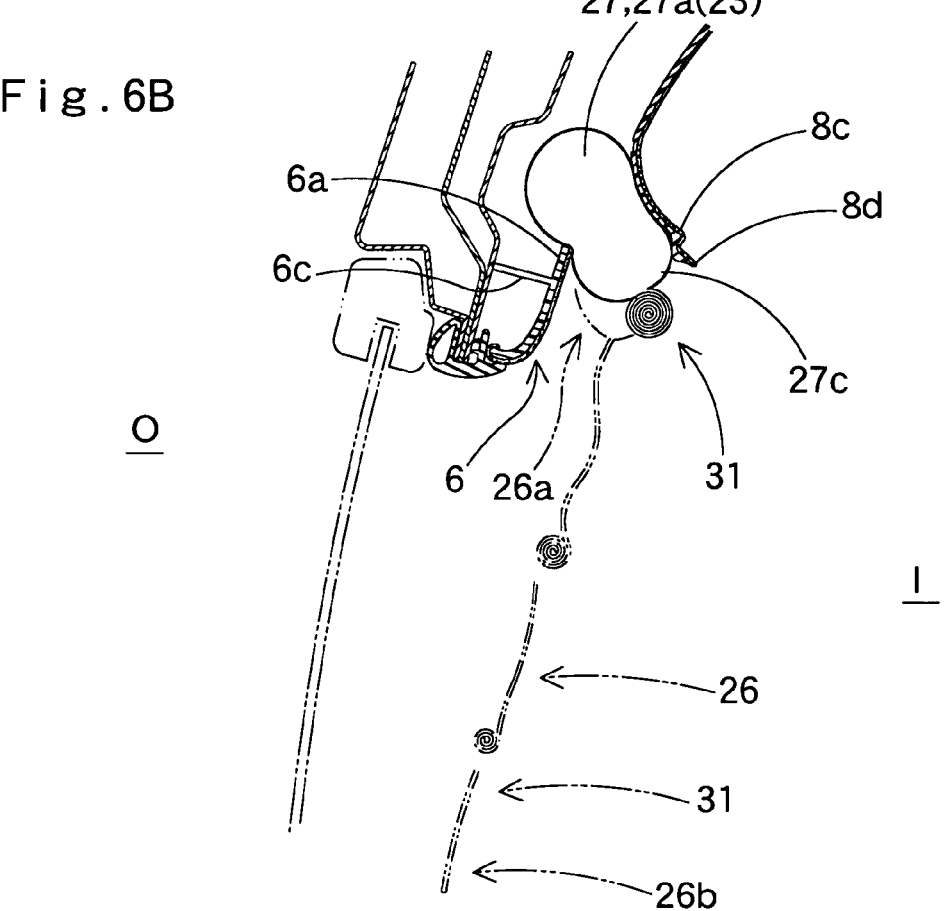
Figure 7A:
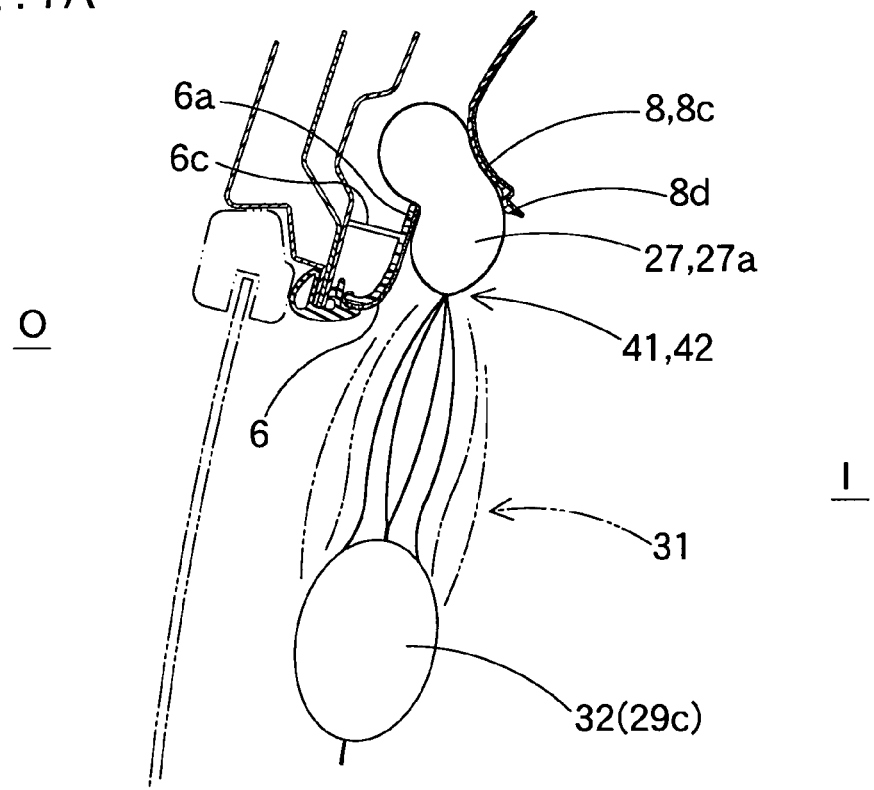
Figure 7B:
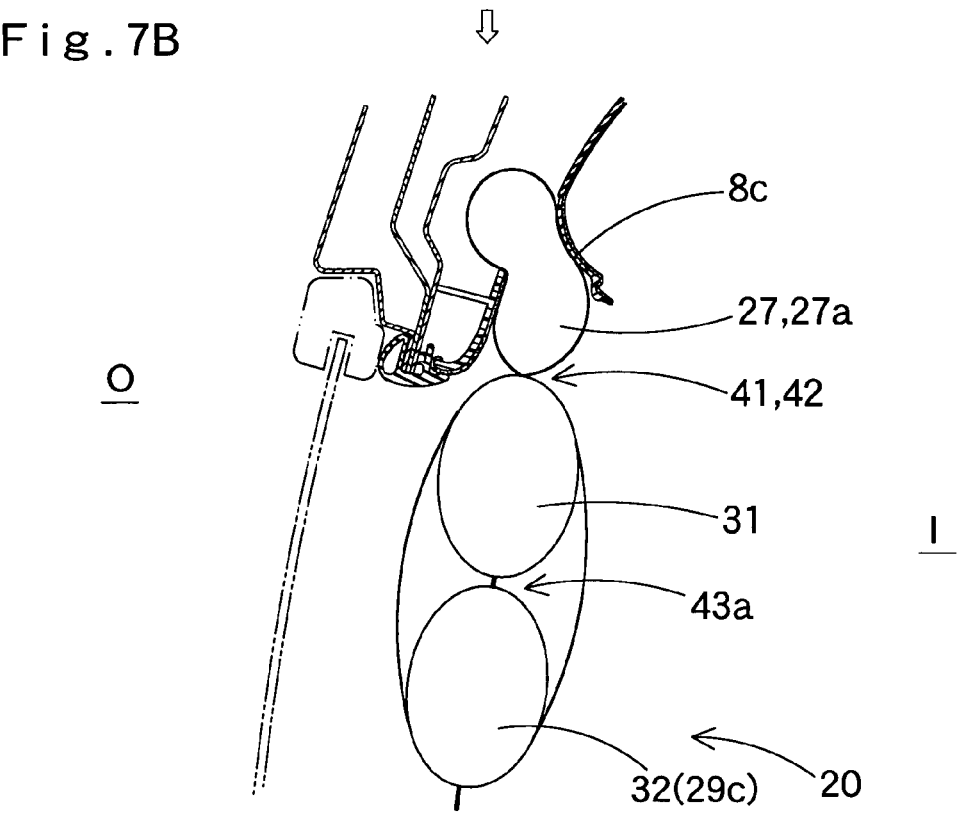
Figure 8A:
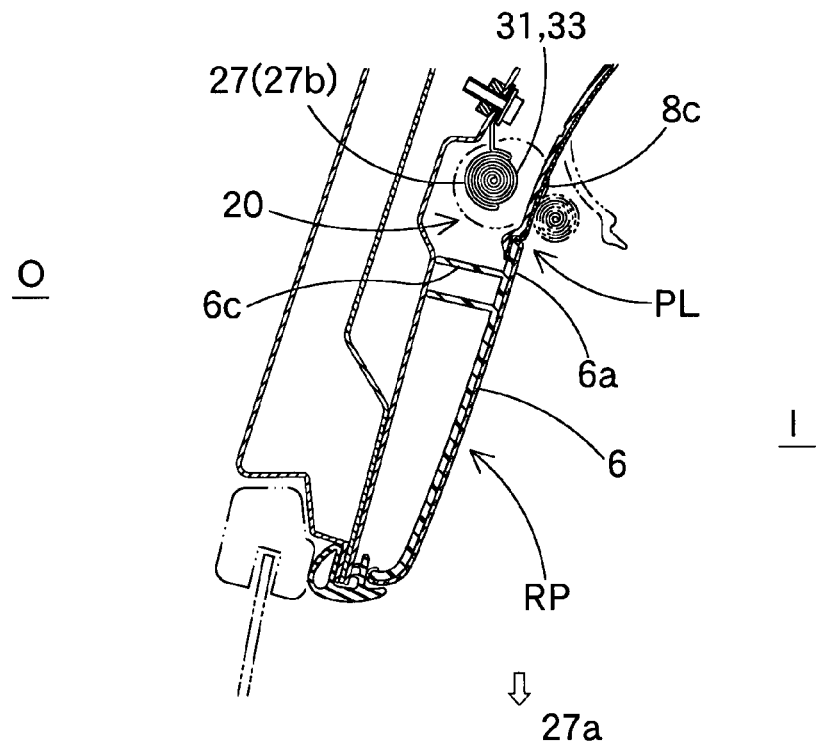
FIGS. 8A, 8B, 9A and 9B are schematic sections of the airbag apparatus of FIG. 1 taken along line VIII-VIII of FIGS. 1 and 2, illustrating the behavior of the apparatus in operation at the vicinity of the rear end of the upper side portion in order.
Figure 8B:
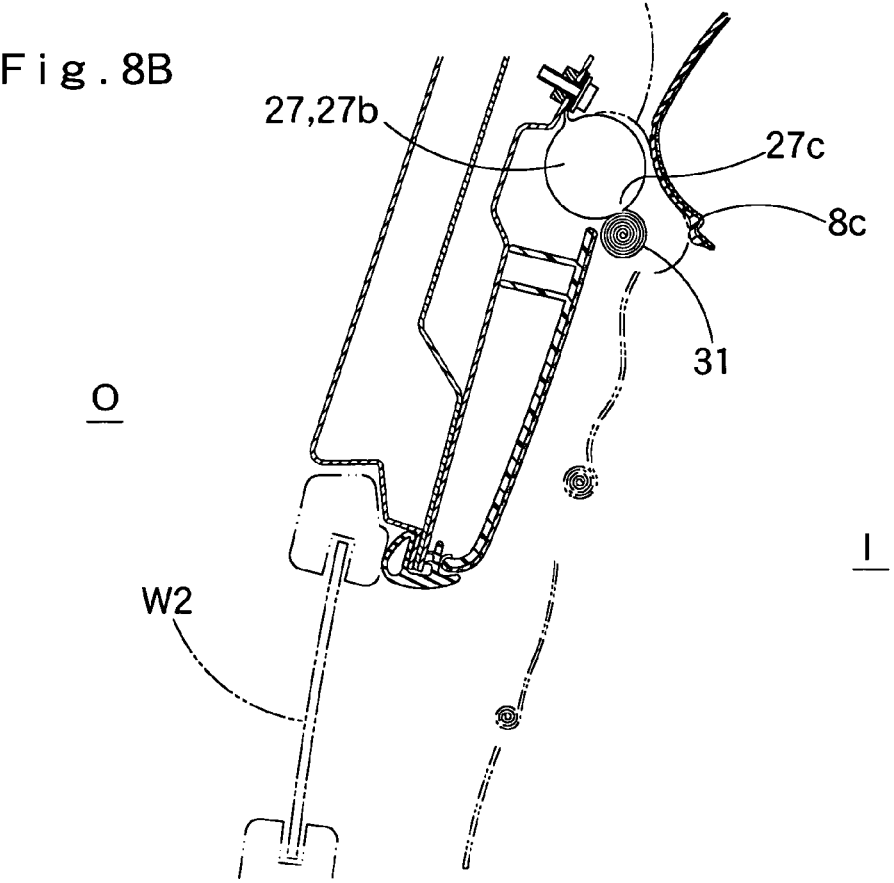

When the upper side portion 27 inflates from the front end 27a to the rear end 27b by inflation gas G and completes inflation, at least the front end 27a region proximate the lower edge 27c of the upper side portion 27 is located below the parting line PL between the upper end 6a of the rear pillar garnish 6 and the lower edge 8d of the pillar side portion 8c of the airbag cover 8 seen on the interior I of vehicle before the airbag cover 8 is opened. Hence at least the front end 27a region of the upper side portion 27 is located at the inner side I of the upper end 6a of the rear pillar garnish 6 as shown in FIGS. 6A, 6B and 7A, so that the upper side portion 27 serves like a chock or wedge disposed between the inner side I of the upper end 6a of the rear pillar garnish 6 and the outer side O of the lower edge 8d of the pillar side portion 8c of the airbag cover 8 disposed above the rear pillar RP. The upper side portion 27 further opens the pillar side portion 8c of the airbag cover 8 toward the interior I and keeps the open state.

The branched portion 29 pushed out toward the interior I by inflation of the upper side portion 27 and the gas feed passage 23 is disposed in an area from the front edge 26c to the lower edge 26b of the rear inflatable portion 26 as shown in FIGS. 2 and 11. The branched portion 29 is designed to admit downward gas G from the opening 29a disposed in front of the front end 41a of the partitioning portion 41 and below the rear end 23c of the gas feed passage 23. Hence the branched portion 29 inflates in such a manner as to extend downward along the interior side I of the side window W2 as shown in FIGS. 10A to 10C. Further, the branched potion 29 is designed to be deployed in front of the rear pillar RP and below the lower edge 8b of the window side portion 8a of the airbag cover 8 disposed on the upper periphery of the side window W2 adjoining the rear pillar RP in front of the rear pillar RP at full inflation of the airbag 20 (FIG. 10C). With this arrangement, as shown in FIGS. 10A to 10c, the branched portion 29 inflates in such a stable manner as to extend downward along the interior side I of the side window W2 without oscillating inward or outward by engaging the rear pillar RP or the like.

As shown in FIGS. 2 and 11, the upper side portion 27 disposed above the main body 31 is closed at the rear end 27b by the partitioning portion 41 extending from the rear edge 20c of the airbag 20 and therefore, the upper side portion 27 is not communicated with the main body 31. Hence the main body 31 admits inflation gas G only from the inlet opening 32 formed between the front end area 41b of the partitioning portion 41 proximate the rear edge 29b of the branched portion 29 and the lower edge 20b of the airbag 20. Further, the branched portion 29 inflates in such a stable manner as to extend downward along the interior side I of the side window W2. Accordingly, the main body 31 inflates with its front edge 31a region supported along the vertical direction by the branched portion 29. Moreover, by the time the main body 31 inflates with inflation gas G fed from the inlet opening 32, the upper side portion 27 has completed inflation and is located like a wedge above the rear pillar RP and keeps the pillar side portion 8c of the airbag cover 8 opened (FIGS. 6B and 7A). As a result, as shown in FIGS. 6A, 6B, 8A and 8B, the main body 31 is firstly pushed out toward the interior I by the inflation of the upper side portion 27 and deploys to cover the interior sides I of the rear pillar RP and the side window W2 adjoining the rear pillar RP in front of the pillar RP. Then as shown in FIGS. 7A, 7B, 9A and 9B, the main body 31 inflates and increases its thickness while covering the interior sides I of the rear pillar garnish 6 and the side window W2 adjoining the garnish 6 below the pillar side portion 8c of the airbag cover 8 opened above the rear pillar RP by the upper side portion 27, without projecting toward the interior I unduly, and then completes inflation.

Therefore, with the head-protecting airbag apparatus M1 of the first embodiment, the airbag 20 smoothly deploys toward the interior I from the vicinity of the upper end 6a of the rear pillar garnish 6 by simple structures of the airbag 20 itself such as the adjustment of locations of respective inflatable chambers of the airbag 20; the gas feed passage 23, the upper side portion 27, the branched portion 29 and the main body 31 and the partitioning portion 41 at the folding and housing or the adjustment of locations of the respective inflatable chambers with respect to the rear pillar RP and the airbag cover 8. Furthermore, with the apparatus M1, the main body 31 deploys in a stable manner without wobbling inward or outward.

Especially in the first embodiment, the partitioning portion 41 partitioning the upper side portion 27 and the main body 31 of the airbag 20 includes the transverse portion 42 extending forward from the rear edge 20c of the airbag 20 and the vertical portion 43 extending downward from the front end 42a of the transverse portion 42 and serving as the front end area 41b of the partitioning portion 41. Further, a region of the rear inflatable portion 26 disposed in front of the vertical portion 43 constitutes the branched portion 29, and the inlet opening 32 of the main body 31 is formed between the lower end 43a of the vertical portion 43 and the lower edge 20b of the airbag 20 at the lower edge 26b of the rear inflatable portion 26.

Figure 9A:
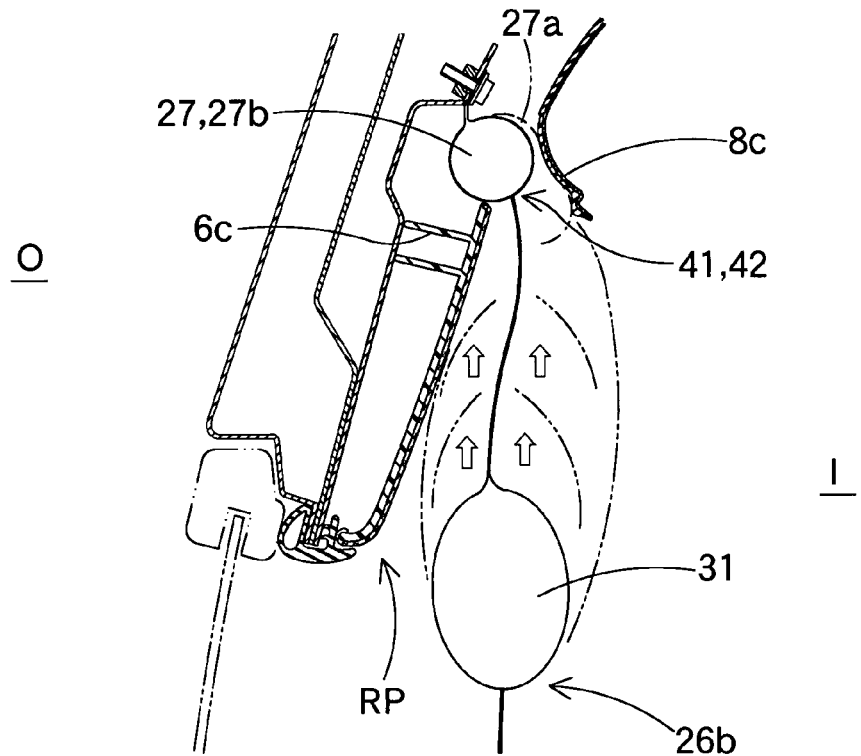
Figure 9B:
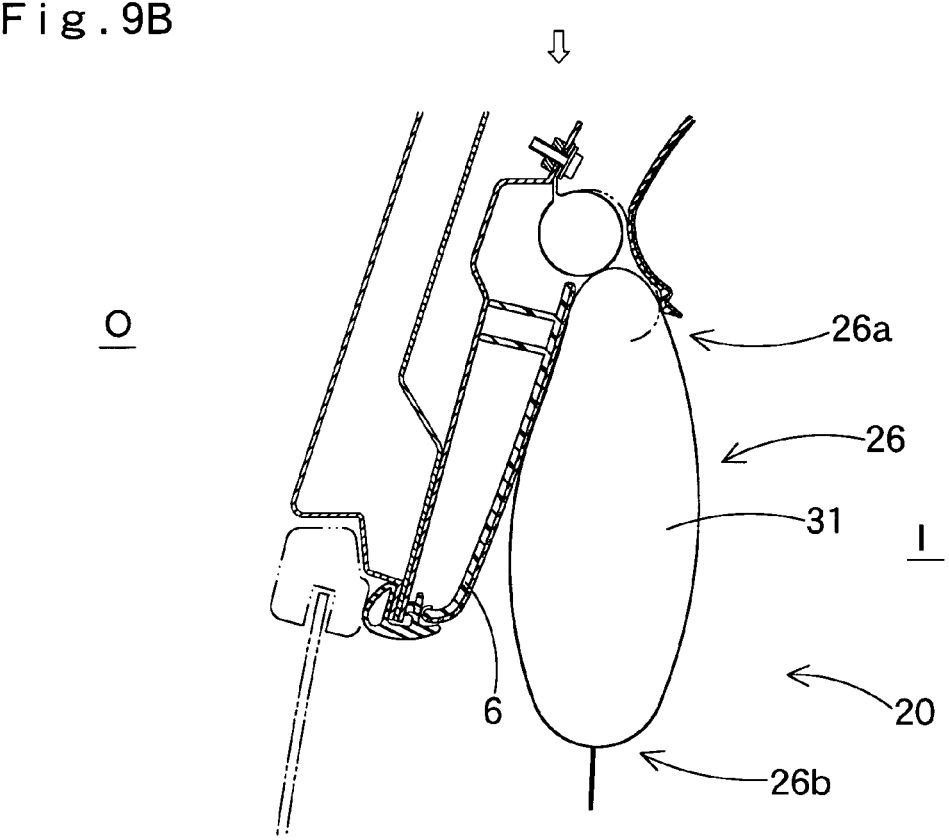

With this structure, when the branched portion 29 admits inflation gas G from the opening 29a disposed below the rear end 23c of the gas feed passage 23, the inflation gas G flows through the branched portion 29 downward smoothly between the front edge 26c of the rear inflatable portion 26, which equals to the rear edge 45a of the panel portion 45, and the vertical portion 43 or the front end area 41b of the partitioning portion 41 (see the phantom lines in FIGS. 2 and 11). Hence the branched portion 29 further stably inflates in a rod shape extending downward along the interior side I of the side window W2 as shown in FIGS. 10A to 10C, without wobbling inward or outward by engaging the rear pillar RP or the like. As a result, the main body 31 is further supported by the branched portion 29 along the vertical direction. On the other hand, as shown in FIGS. 9A and 9B, the main body 31 admits inflation gas G via the inlet opening 32 disposed at the lower end 29c of the rear edge 29b of the branched portion 29 and which gas G flows rearward and then upward. Thus the main body 31 inflates from the lower edge 26b region of the rear inflatable portion 26 toward the upper edge 26a of the rear inflatable portion 26 proximate the upper side portion 27 which has completed inflation and is in a generally stationary state. That is, the main body 31 inflates from the lower end 29c region of the branched potion 29 toward the upper side portion 27 in a state where it is supported at its front edge 31a and top side (i.e., at the transverse portion 42) by the branched portion 29 and the upper side portion 27 both having fully inflated and being in settled postures. Therefore, the main body 31 deploys in a further stable manner without wobbling inward or outward.

Figure 12:
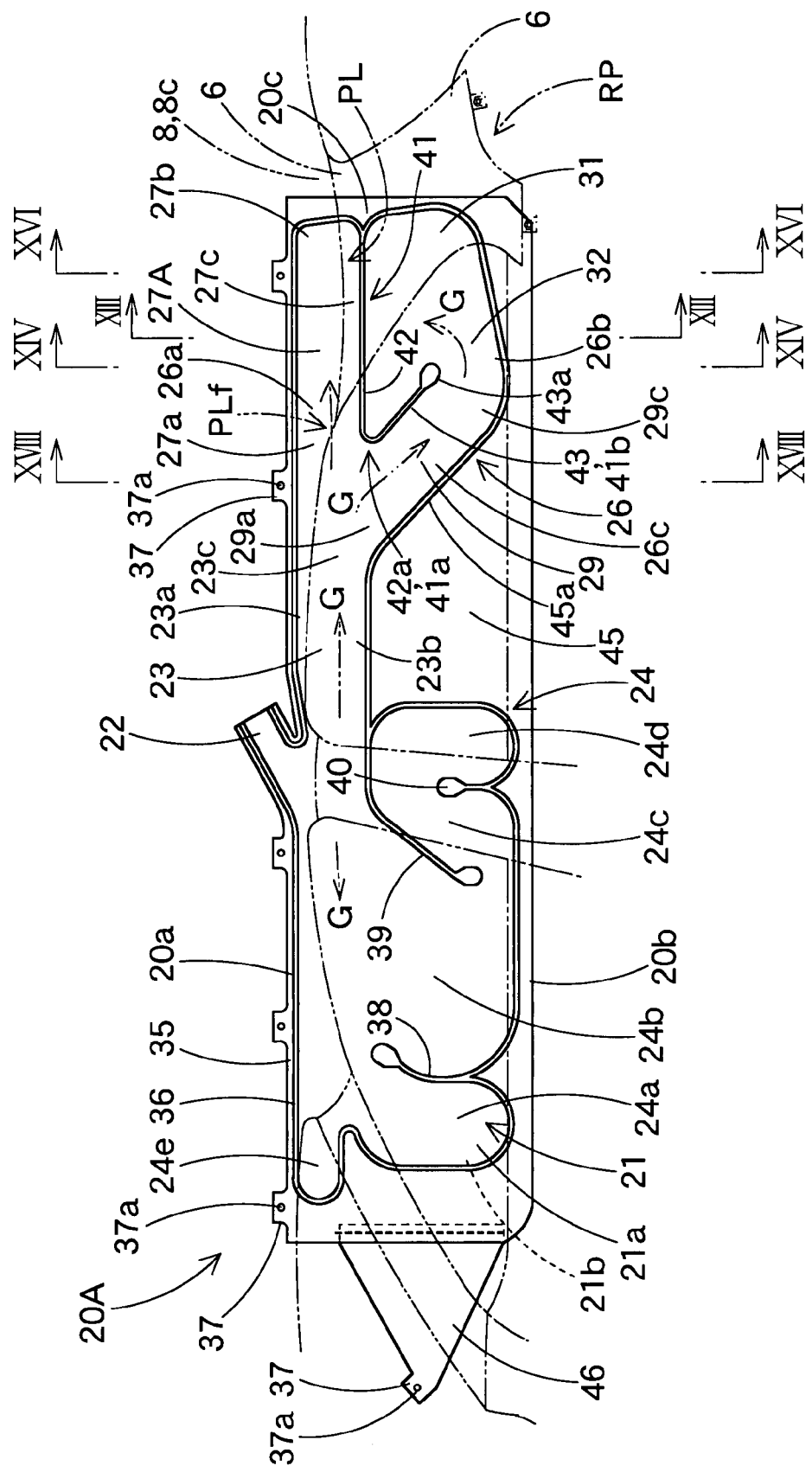
FIG. 12 is a front view of an airbag used in the second embodiment of the invention.
Figure 13:
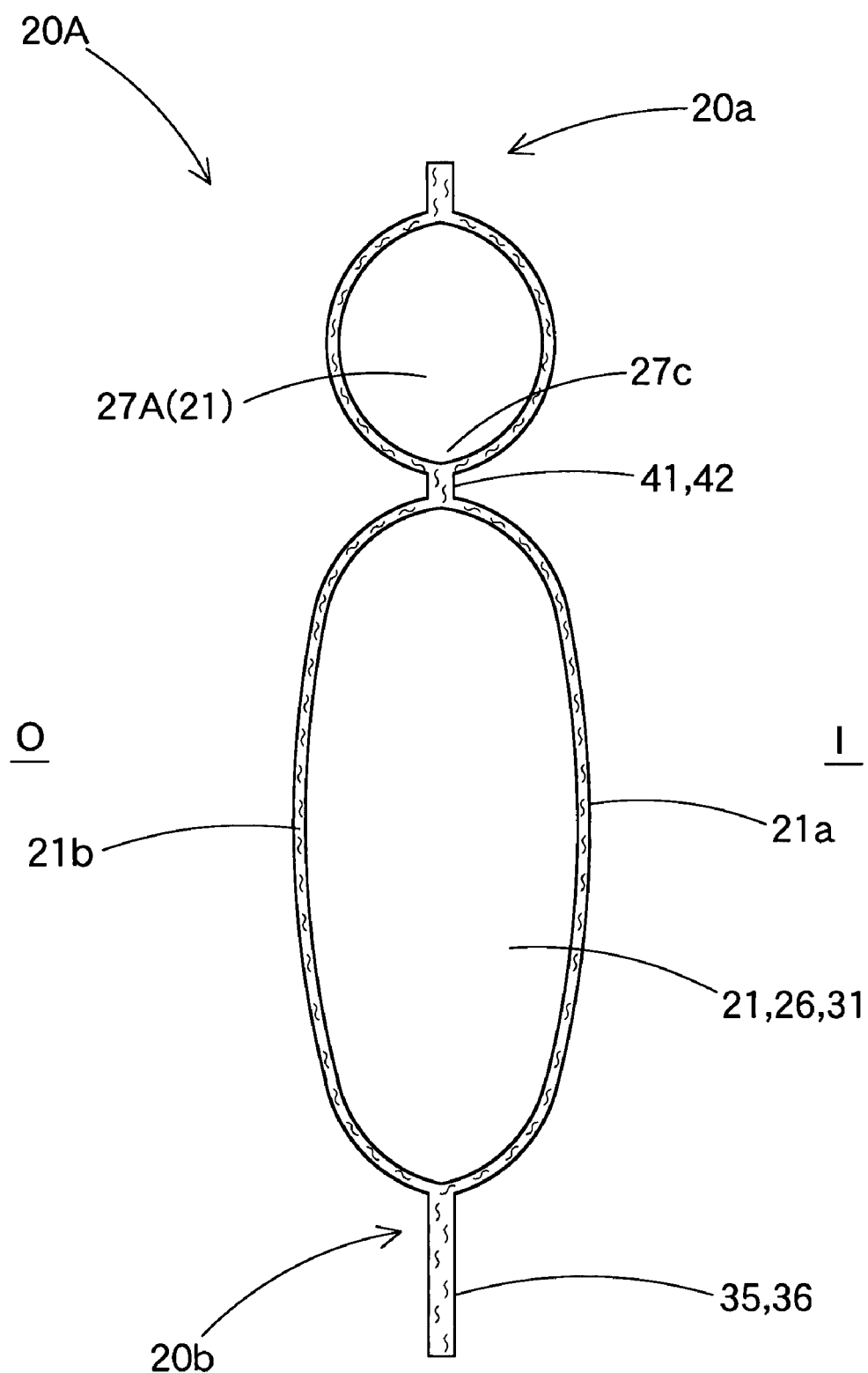
FIG. 13 is a schematic section of the airbag of FIG. 12 upon inflation taken along line XIII-XIII of FIG. 12.
Figure 14A:
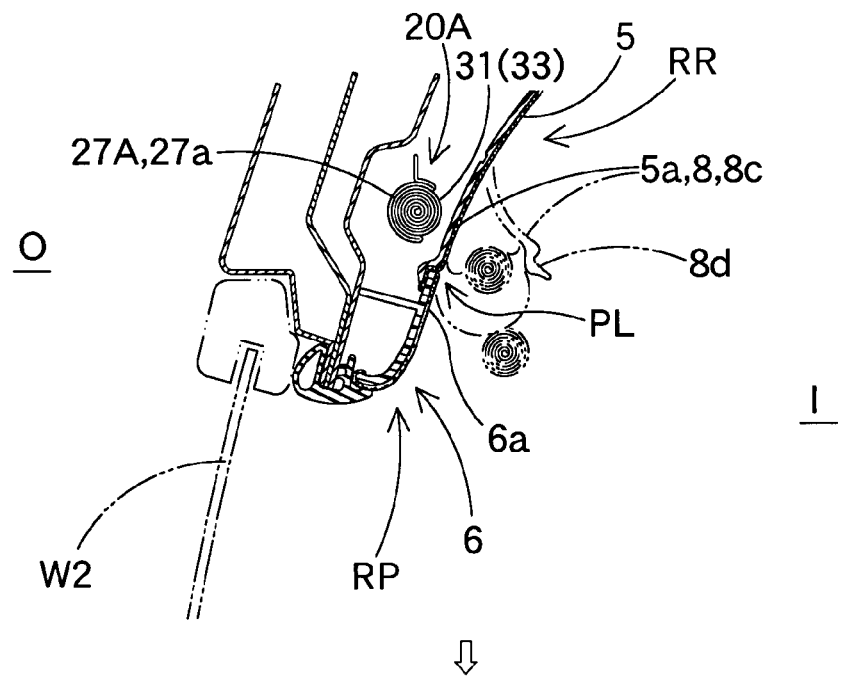
FIGS. 14A, 14B, 15A and 15B are schematic sections of an airbag apparatus of the second embodiment taken along line XIV-XIV of FIG. 12, illustrating a behavior of the apparatus in operation at the vicinity of the front end of the upper side portion in order.
Figure 14B:
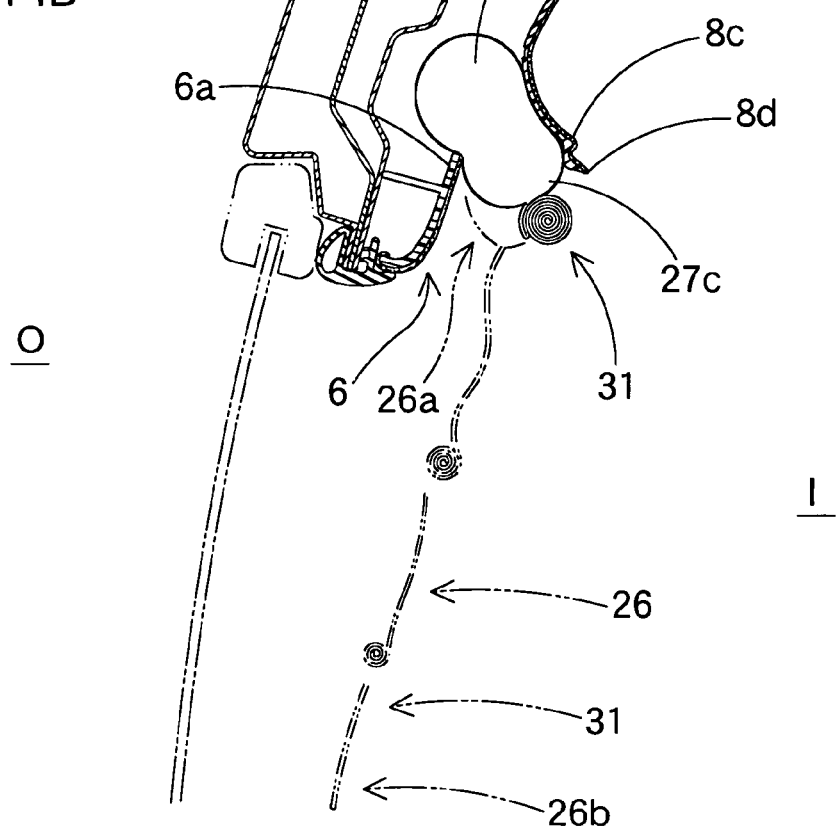
Figure 15A:
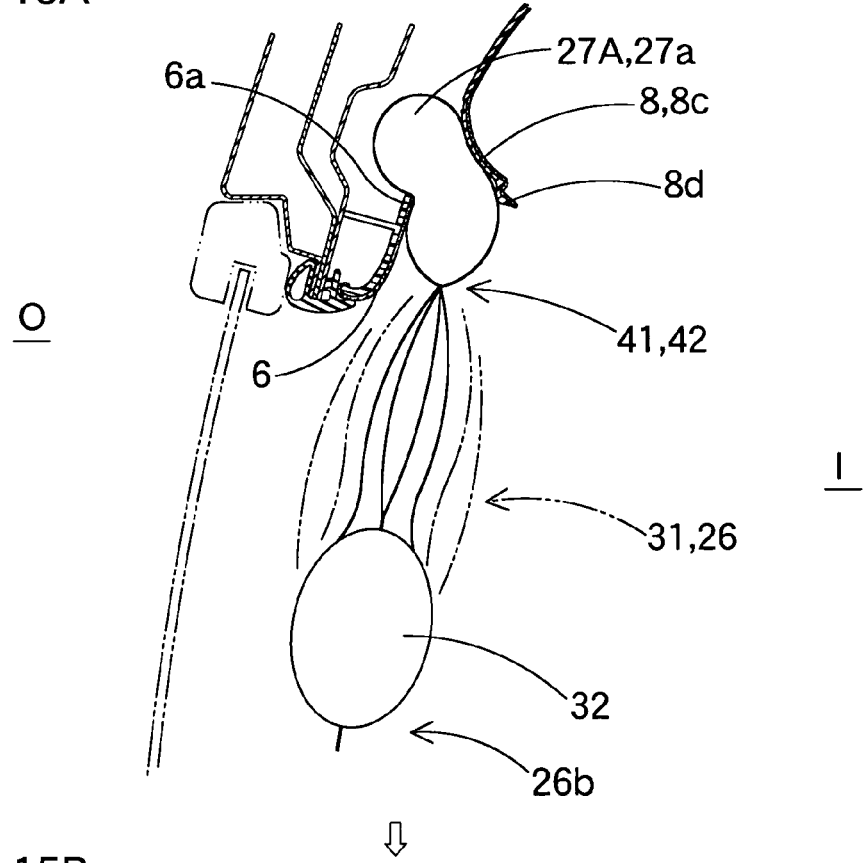
Figure 15B:
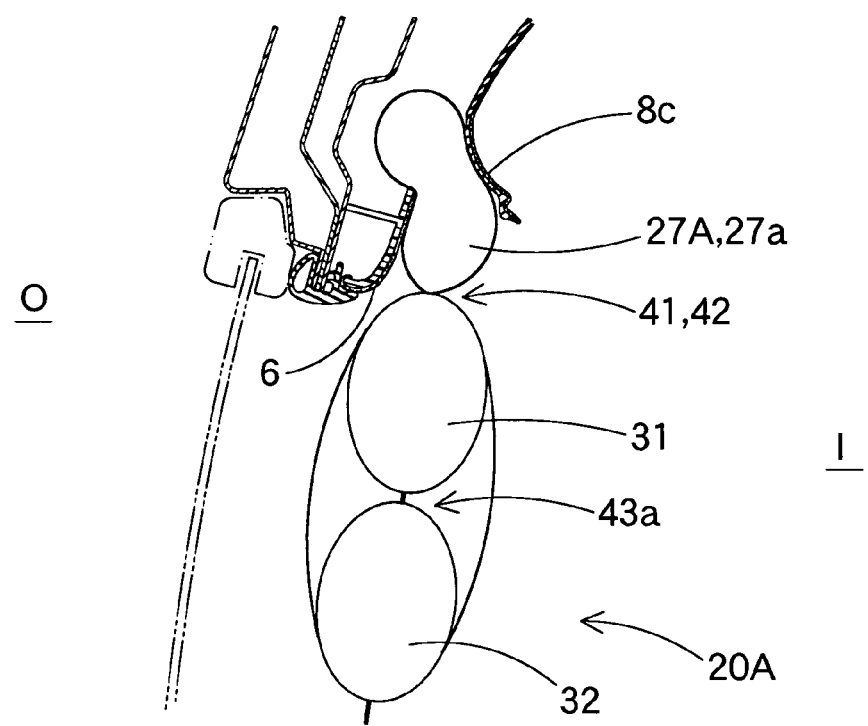
Figure 16A:
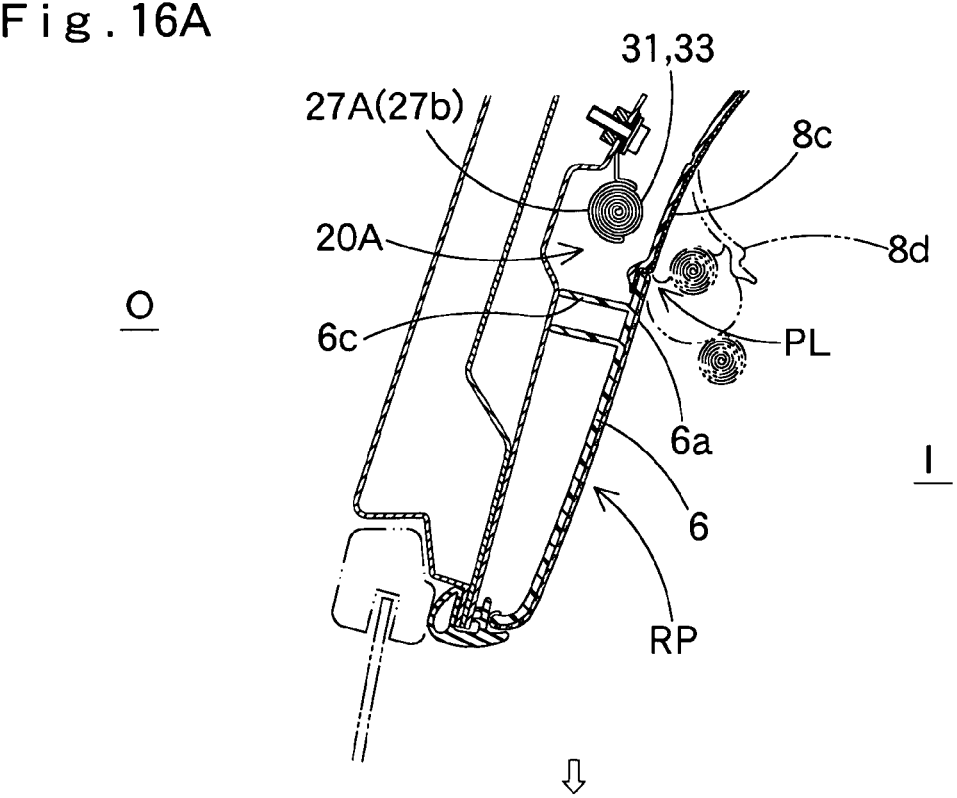
FIGS. 16A, 16B, 17A and 17B are schematic sections of the airbag apparatus of the second embodiment taken along line XVI-XVI of FIG. 12, illustrating the behavior of the apparatus in operation at the vicinity of the rear end of the upper side portion in order.
Figure 16B:
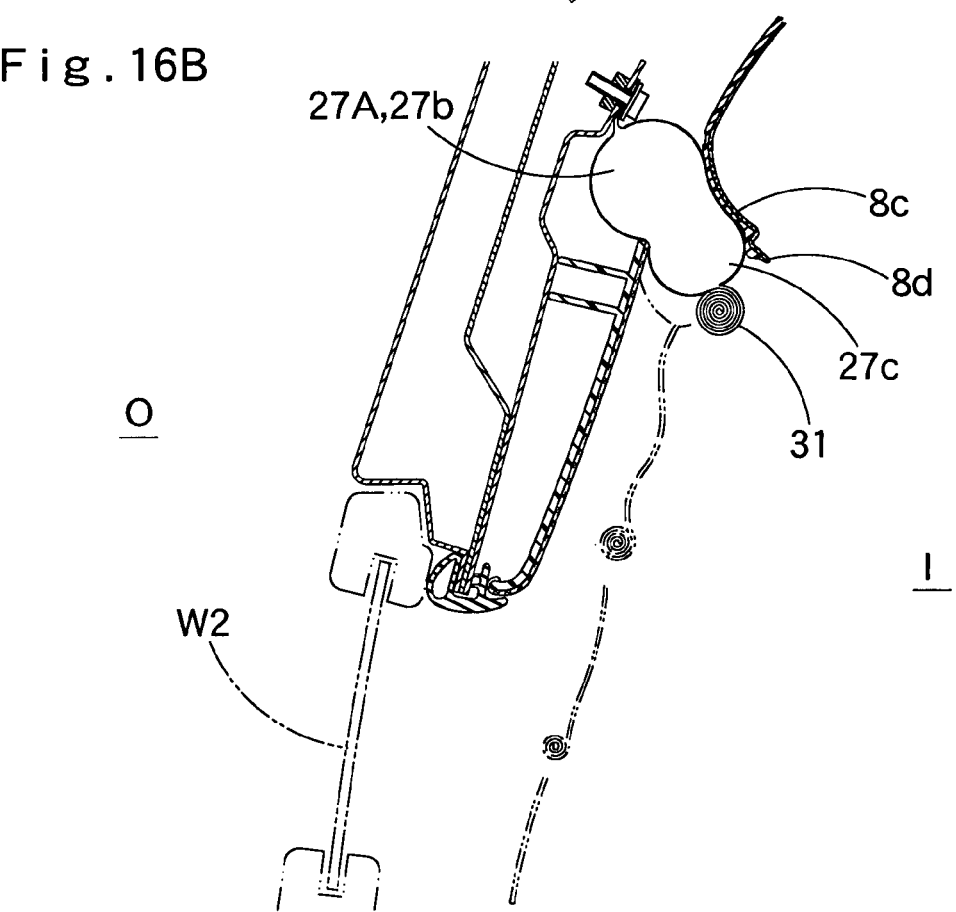
Figure 17A:
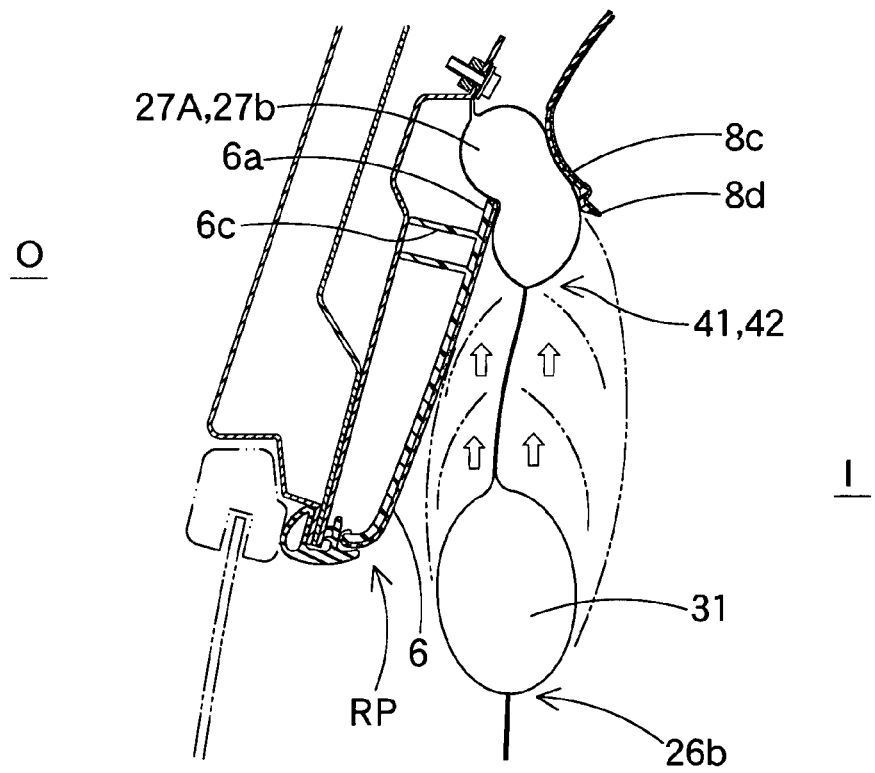
Figure 17B:
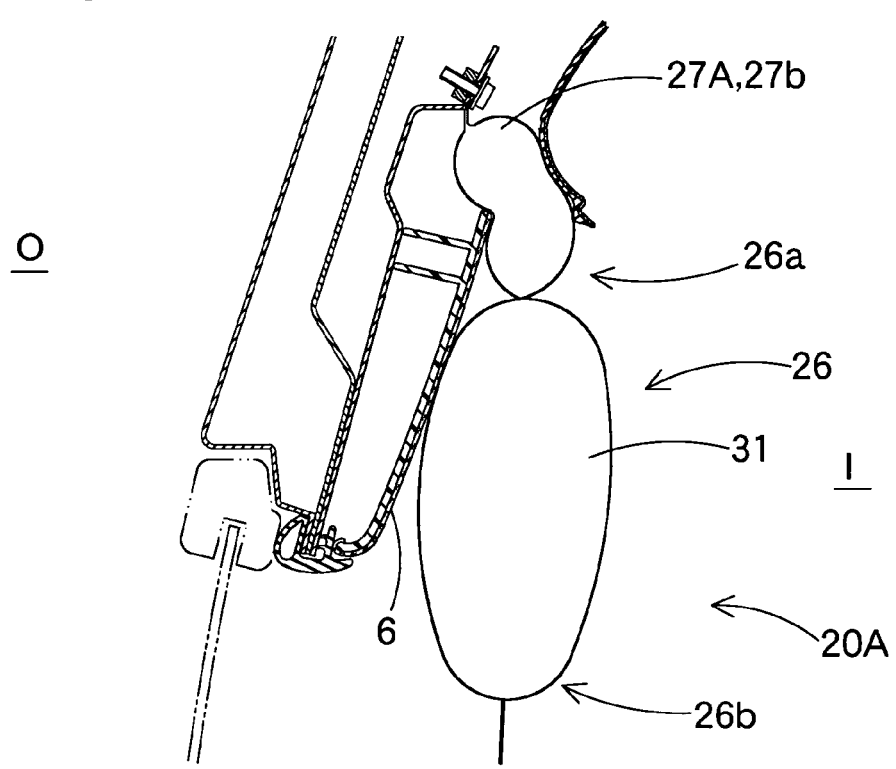
Figure 19:
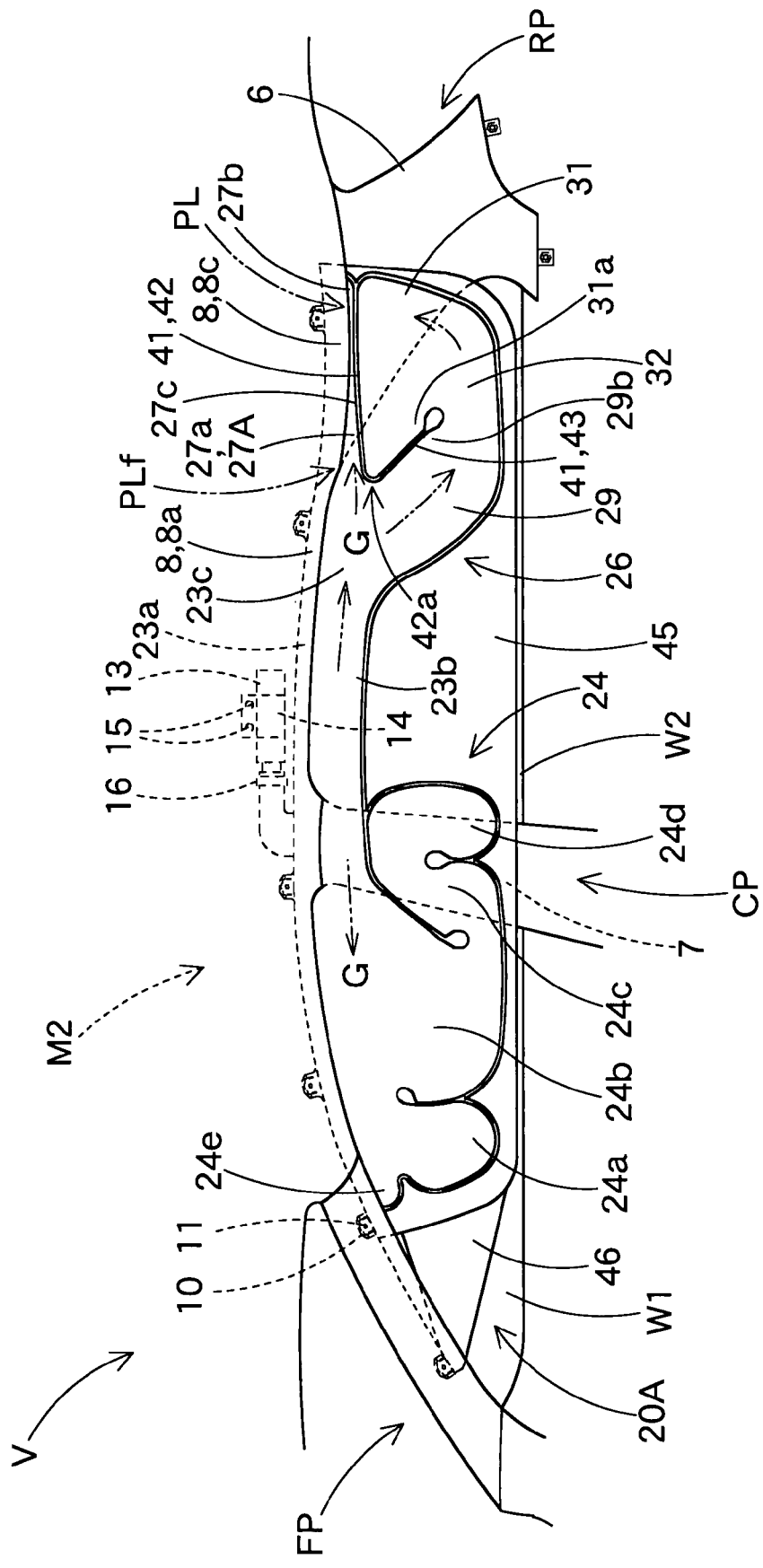
FIG. 19 is a schematic front view of the airbag apparatus of the second embodiment having completed operation.

In the first embodiment, the upper side portion 27 of the airbag 20 is designed to reduce its inner diameter gradually from the front side toward the rear at full inflation. Moreover, a part of the front end 27a region of the upper side portion 27 proximate the lower edge 27c is deployed, at full airbag inflation, below the parting line PL between the upper end 6a of the rear pillar garnish 6 and the lower edge 8d of the pillar side portion 8c of the airbag cover 8 seen on the interior I of vehicle before the airbag cover 8 is opened. However, like an airbag 20A of a head-protecting airbag apparatus M2 according to the second embodiment of the invention shown in FIGS. 12 and 19, it will also be appreciated that an upper side portion 27A has an even inner diameter over its generally entire length in the longitudinal direction at full inflation, and that a whole lower edge 27c of the upper side portion 27A is deployed below the parting line PL between the upper end 6a of the rear pillar garnish 6 and the lower edge 8d of the pillar side portion 8c of the airbag cover 8 seen on the interior I of vehicle before the airbag cover 8 is opened, at full inflation of the airbag 20A.

The head-protecting airbag apparatus M2 of the second embodiment differs from the first embodiment only in the structure of the upper side portion 27A of the airbag 20A, and remaining parts of the airbag 20A and remaining components of the apparatus M2 such as the inflator 13 are structured in similar fashions to the first embodiment. Therefore, descriptions of the parts and components similar to the first embodiment will be omitted while assigning common reference numerals with the first embodiment to those parts and components. Further, the airbag 20A is manufactured and mounted on the vehicle through similar processes to the first embodiment.

In the second embodiment, too, in the initial stage of airbag deployment, in the rear inflatable portion 26, the gas feed passage 23 disposed along the longitudinal direction and the upper side portion 27A arranged to follow the feed passage 23 along the longitudinal direction inflate swiftly from the front to the rear. Then the gas feed passage 23 and the upper side portion 27A push out the main body 31 and branched portion 29 disposed therebelow toward the interior I as shown in FIGS. 14A, 14B, 16A, 16B, 18A and 18B. Hence the main body 31 gets over the upper end 6a of the rear pillar garnish 6 and deploys to cover the interior sides I of the rear pillar RP and the side window W2 adjoining the rear pillar RP in front of the pillar RP together with the branched portion 29.

When the upper side portion 27A inflates from the front end 27a to the rear end 27b by inflation gas G and completes inflation, the whole lower edge 27c of the upper side portion 27A from the front end 27a to the rear end 27b is located below the parting line PL between the upper end 6a of the rear pillar garnish 6 and the lower edge 8d of the pillar side portion 8c of the airbag cover 8 seen on the interior I of vehicle before the airbag cover 8 is opened. Hence the whole upper side portion 27A from the front end 27a to the rear end 27b is located at the inner side I of the upper end 6a of the rear pillar garnish 6 as shown in FIGS. 14B to 15A and 16B to 17A, so that it serves like a chock or wedge disposed between the inner side I of the upper end 6a of the rear pillar garnish 6 and the outer side O of the lower edge 8d of the pillar side portion 8c of the airbag cover 8 disposed above the rear pillar RP. The upper side portion 27A further opens the pillar side portion 8c of the airbag cover 8 toward the interior I and keeps the open state.

The main body 31 pushed out toward the interior I by the inflation of the upper side portion 27A and the gas feed passage 23 deploys to cover the interior sides I of the rear pillar RP and the side window W2 adjoining the rear pillar RP in front of the rear pillar RP as shown in FIGS. 15A, 15B, 17A and 17B. In the meantime, inflation gas G flown through the branched portion 29 extending downward from the gas feed passage 23 flows into the main body 31 rearward via the inlet opening 32 disposed at the lower end of the branched portion 29 and at the lower edge 26b of the rear inflatable portion 26, and then flows upward, thereby fully inflating the main body 31.

Figure 18A:
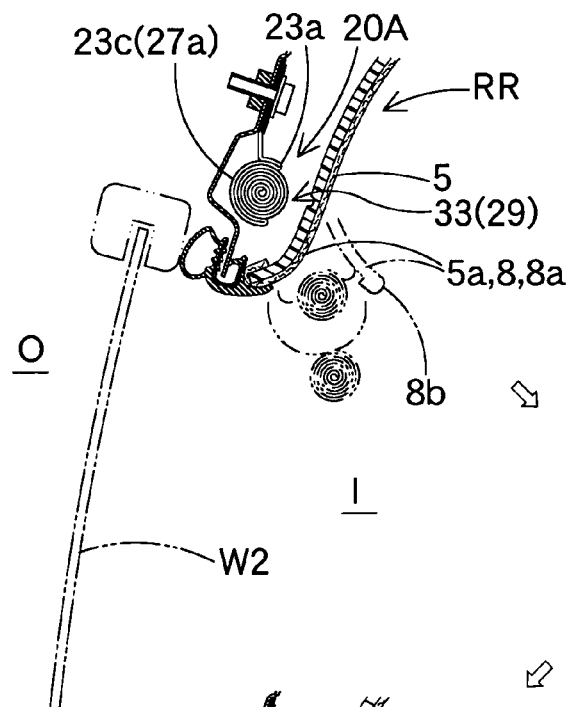
FIGS. 18A, 18B and 18C are schematic sections of the airbag apparatus of the second embodiment taken along line XVIII-XVIII of FIG. 12, illustrating the behavior of the apparatus in operation at the vicinity of the rear end of the gas feed passage in order.
Figure 18B:
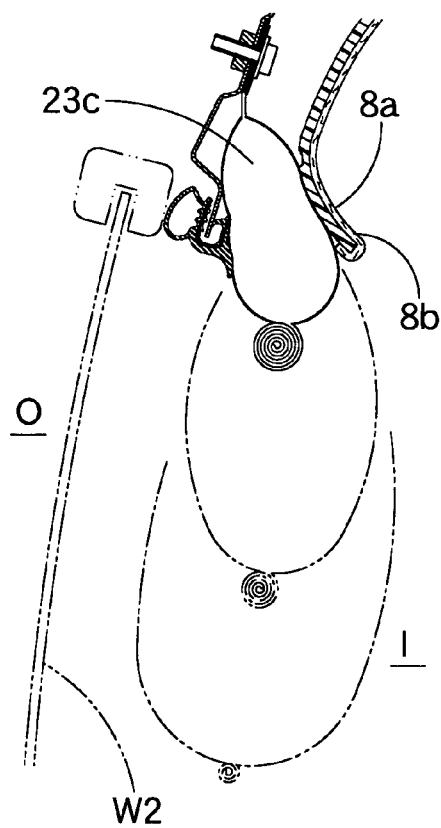
Figure 18C:
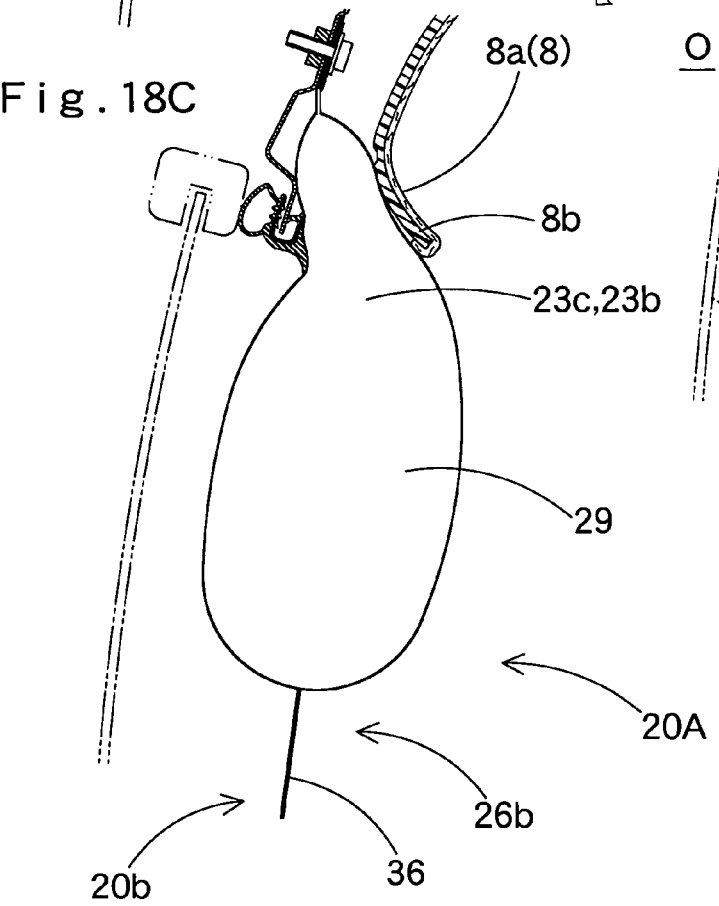

At that time, the branched potion 29 guiding inflation gas G to the main body 31 is designed to be deployed in front of the rear pillar RP and below the lower edge 8b of the window side portion 8a of the airbag cover 8 disposed on the upper periphery of the side window W2 adjoining the rear pillar RP in front of the rear pillar RP at full inflation of the airbag 20 (FIG. 18C). Accordingly, as shown in FIGS. 18A, 18B and 18C, the branched portion 29 inflates into a rod shape in such a stable manner as to extend downward along the interior side I of the side window W2 without oscillating inward or outward by engaging the rear pillar RP or the like. As a result, the branched portion 29 helps deploy the main body 31 along the interior sides I of the rear pillar RP and the window W2 in a stable manner without allowing the main body 31 to project toward the interior I of vehicle. Furthermore, the branched portion 29 smoothly supplies the main body 31 with inflation gas G fed from the gas feed passage 23 firstly rearward and then upward via the inlet opening 32 disposed at the lower end (see phantom lines in FIGS. 12 and 19).

The upper side portion 27A disposed above the main body 31 is closed at the rear end 27b by the partitioning portion 41 extending from the rear edge 20c of the airbag 20 and therefore, the upper side portion 27A is not in communication with the main body 31. Hence the main body 31 completes inflation only by the inflation gas G fed rearward and upward from the inlet opening 32 formed at the front edge of the main body 31 proximate the lower edge 26b of the rear inflatable portion 26. Moreover, by the time the main body 31 starts to inflate from the lower edge 26b of the rear inflatable portion 26 with inflation gas G fed from the inlet opening 32, the upper side portion 27A has completed inflation and is located like a wedge above the rear pillar RP and keeps the pillar side portion 8c of the airbag cover 8 opened (FIGS. 15A, 15B, 17A and 17B). As a result, the main body 31 inflates and increases its thickness upward from the lower edge 26b region of the rear inflatable portion 26 under the pillar side portion 8c of the airbag cover 8 opened above the rear pillar RP in a stable manner while covering the interior sides I of the rear pillar garnish 6 and the side window W2, without projecting toward the interior I unduly, and then completes inflation.

Therefore, with the head-protecting airbag apparatus M2 of the second embodiment, too, the airbag 20A smoothly deploys toward the interior I from the vicinity of the upper end 6a of the rear pillar garnish 6 by simple structures of the airbag 20A itself such as the adjustment of locations of respective inflatable chambers of the airbag 20A; the gas feed passage 23, the upper side portion 27A, the branched portion 29 and the main body 31, and the partitioning portion 41 at the folding and housing or the adjustment of locations of the respective inflatable chambers with respect to the rear pillar RP and the airbag cover 8. Furthermore, with the apparatus M2, too, the main body 31 deploys in a stable manner without wobbling inward or outward.

The upper side portion of the airbag may have a uniform inner diameter generally all along its longitudinal length at full inflation like the upper side portion 27A of the airbag 20A in the second embodiment. Alternatively, the upper side portion may be designed so that its inner diameter is gradually reduced from the front side (front end) 27a toward the rear (rear end) 27b at full inflation like the upper side portion 27 of the airbag 20 in the first embodiment. If the upper side portion has a uniform inner diameter generally all along its longitudinal length at full inflation as in the second embodiment, the pillar side portion 8c of the airbag cover 8 is wide opened toward the interior I by the upper side portion 27A over a wide range in the longitudinal direction above the rear pillar RP. In this case, accordingly, the manner the main body 31 deploys is further stabilized. On the other hand, if the upper side portion is so designed to reduce its inner diameter gradually from the front end 27a to the rear end 27b at full inflation like the upper side portion 27 in the first embodiment, the area the pillar side portion 8c of the airbag cover 8 is opened wide toward the interior I becomes less. In this case however, the upper side portion 27 comes to have a reduced volume and which allows a greater volume for the main body 31. Consequently, a protection area of the main body 31 is enlarged.

As in the airbag 20A of the second embodiment, the transverse portion 42 of the partitioning portion 41 extending continuously forward from the rear edge 20c of the airbag 20A may be designed to extend along and below the parting line PL at full inflation of the airbag 20A. With this structure, the whole lower edge 27c of the upper side portion 27A is deployed to extend along and below the parting line PL at full inflation of the airbag 20A, which helps open the pillar side portion 8c of the airbag cover 8 wide toward the interior I over a wide range in the longitudinal direction above the rear pillar RP. Additionally, the whole main body 31 is smoothly projected toward the interior I from the vicinity of the parting line PL upon inflation of the upper side portion 27A.

The partitioning portion 41 of the airbag 20/20A in the first/second embodiment includes the vertical portion 43 extending downward from the front end 41a. However, the partitioning portion formed within the rear inflatable portion 26 for partitioning the upper side portion 27 and the main body 31 does not necessarily have to include the vertical portion as in an airbag 20B shown in FIGS. 20 and 21.

The airbag 20B includes a partitioning portion 41B which is configured to bulge toward the main body 31, i.e. downward at the front end 41a of the partitioning portion 41 of the airbag 20 so as to prevent a stress concentration upon inflation, but does not include a vertical portion 43. Further, in the airbag 20B, the lower end 45c of the rear edge 45a of the panel portion 45 at the front edge 26c of the rear inflatable portion 26 extends downward generally orthogonally to the peripheral portion 36 at the lower edge 20b of the airbag 20B.

Figure 21:
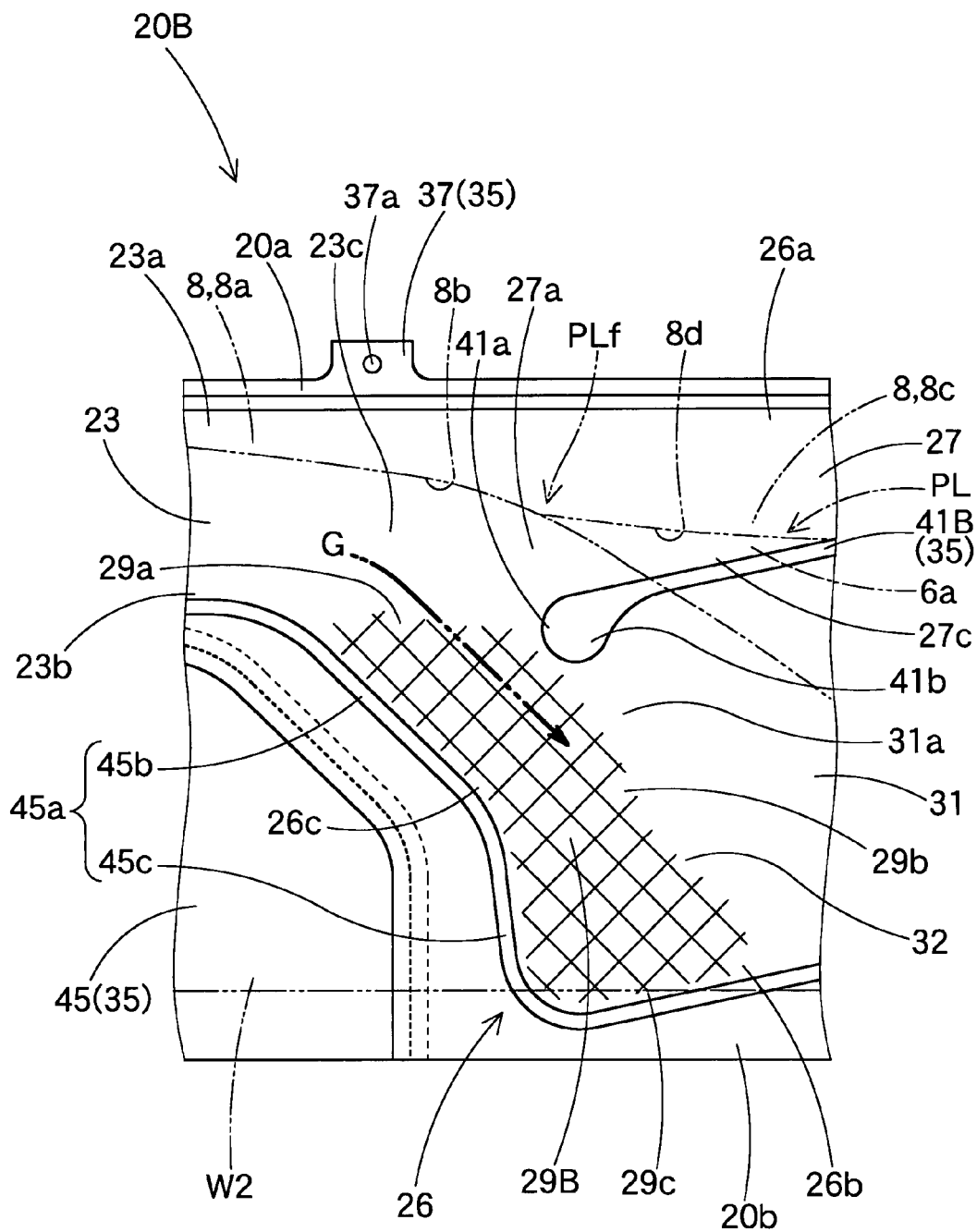
FIG. 21 is an enlarged view of the vicinity of the front end of a partitioning portion of the airbag of FIG. 20.

In the airbag 20B, too, the branched portion 29B is formed in a region from the front edge 26c to the lower edge 26b of the rear inflatable portion 26 in front of the main body 31, i.e. in a region partitioned by the rear edge 45a of the panel portion 45 of the non-admissive portion 35. The branched portion 29B is to be deployed, at full inflation of the airbag 20B, in front of the rear pillar RP and below the lower edge 8b of the window side portion 8a of the airbag cover 8 arranged on the upper periphery of the side window W2 adjoining the rear pillar RP in front of the rear pillar RP. Further, the opening 29a of the branched portion 29B introducing inflation gas G downward from the gas feed passage 23 is disposed in front of the front end 41a of the partitioning portion 41B and below the rear end 23c of the gas feed passage 23. The inlet opening 32 introducing inflation gas into the main body 31 is a wide-open area between the front end area 41b of the partitioning portion 41B and the lower edge 26b of the rear inflatable portion 26 or lower edge 20b of the airbag 20B at the rear edge 29b of the branched portion 29B. In FIG. 21, the branched portion 29B is indicated by grid-like hatched lines.

Remaining parts of the airbag 20B are structured similarly to the airbag 20 of the first embodiment, and therefore, descriptions of those parts will be omitted by assigning them common reference numerals.

If inflation gas G is fed to the airbag 20B housed on the upper periphery of the side window W2 in a folded state, the gas feed passage 23 disposed along the longitudinal direction and the upper side portion 27 arranged to follow the feed passage 23 along the longitudinal direction in the rear inflatable portion 26 inflate swiftly from the front to the rear. Then the gas feed passage 23 and the upper side portion 27 push out the main body 31 and branched portion 29B disposed therebelow toward the interior I. Hence the main body 31 hurdles the upper end 6a of the rear pillar garnish 6 and deploys to cover the interior sides I of the rear pillar RP and the side window W2 adjoining the rear pillar RP in front of the pillar RP together with the branched portion 29B.

When the upper side portion 27 inflates from the front end 27a to the rear end 27b and completes inflation, at least the front end 27a region proximate the lower edge 27c of the upper side portion 27 is located below the parting line PL between the upper end 6a of the rear pillar garnish 6 and the lower edge 8d of the pillar side portion 8c of the airbag cover 8 seen on the interior I of vehicle before the airbag cover 8 is opened. Hence at least the front end 27a region of the upper side portion 27 is located at the inner side I of the upper end 6a of the rear pillar garnish 6, so that the upper side portion 27 serves like a chock or wedge disposed between the inner side I of the upper end 6a of the rear pillar garnish 6 and the outer side O of the lower edge 8d of the pillar side portion 8c of the airbag cover 8 disposed above the rear pillar RP. The upper side portion 27 further opens the airbag cover 8 toward the interior I and keeps the open state.

The branched portion 29B pushed out toward the interior I by inflation of the upper side portion 27 and the gas feed passage 23 is disposed in the area from the front edge 26c to the lower edge 26b of the rear inflatable portion 26. The branched portion 29B is designed to admit downward gas G from the opening 29a disposed in front of the front end 41a of the partitioning portion 41B and below the rear end 23c of the gas feed passage 23. Hence the branched portion 29B inflates in such a manner as to extend downward along the interior side I of the side window W2. Further, the branched potion 29B is designed to be deployed in front of the rear pillar RP and below the lower edge 8b of the window side portion 8a of the airbag cover 8 disposed on the upper periphery of the side window W2 adjoining the rear pillar RP in front of the rear pillar RP at full inflation of the airbag 20B. Accordingly, the branched portion 29B inflates in such a stable manner as to extend downward along the interior side I of the side window W2 without oscillating inward or outward by engaging the rear pillar RP or the like.

The upper side portion 27 disposed above the main body 31 is closed at the rear end 27b by the partitioning portion 41B extending from the rear edge 20c of the airbag 20 and therefore, the upper side portion 27 is not in communication with the main body 31. Hence the main body 31 admits inflation gas G only from the inlet opening 32 formed between the front end area 41b of the partitioning portion 41B proximate the rear edge 29b of the branched portion 29B and the lower edge 20b of the airbag 20. Further, the branched portion 29B inflates in such a stable manner as to extend downward along the interior side I of the side window W2. Accordingly, the main body 31 inflates with its front edge 31a region supported along the vertical direction by the branched portion 29B. Moreover, by the time the main body 31 inflates with inflation gas G fed from the inlet opening 32, the upper side portion 27 has completed inflation and is located like a wedge at the upper region of the rear pillar RP and keeps the pillar side portion 8c of the airbag cover 8 opened. As a result, the main body 31 is firstly pushed out toward the interior I by the inflation of the upper side portion 27 and gas feed passage 23 and deploys to cover the interior sides I of the rear pillar RP and the side window W2 adjoining the rear pillar RP in front of the pillar RP. Then the main body 31 inflates and increases its thickness while covering the interior sides I of the rear pillar garnish 6 and the side window W2 adjoining the garnish 6 below the pillar side portion 8c of the airbag cover 8 opened above the rear pillar RP by the upper side portion 27, without projecting toward the interior I unduly, and then completes inflation. That is, the airbag 20B attains the same working-effects as the airbag 20 of the first embodiment.

Figure 20:
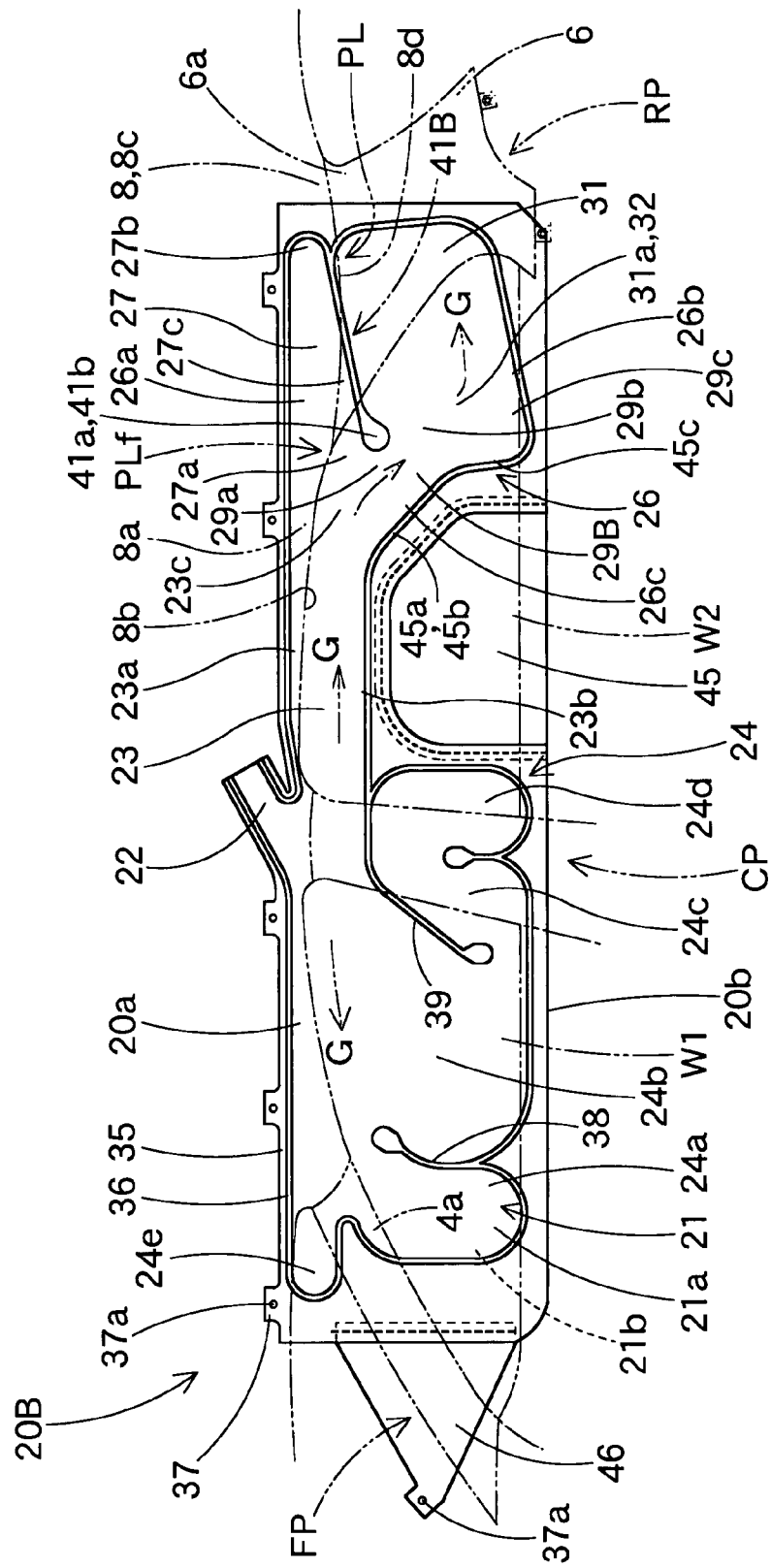
FIG. 20 is a front view of a modification of the airbag of the first embodiment.

Further, in the airbag 20B shown in FIGS. 20 and 21, the lower end 45c of the rear edge 45a of the panel portion 45 at the front edge 26c of the rear inflatable portion 26 extends downward generally orthogonally to the peripheral portion 36 at the lower edge 20b of the airbag 20B. Hence the length of the branched portion 29B from the opening 29a to the lower end 29c is shorter than that of the branched portion 29 of the airbag 20 of the first embodiment, which branched portion 29 extends diagonally rearward and downward from the opening 29a toward the lower end 29c. Accordingly, when the inflation gas G flows in, the rear inflatable portion 26 of the airbag 20B is unfolded downward more swiftly to the lower edge 26b.

Figure 22:
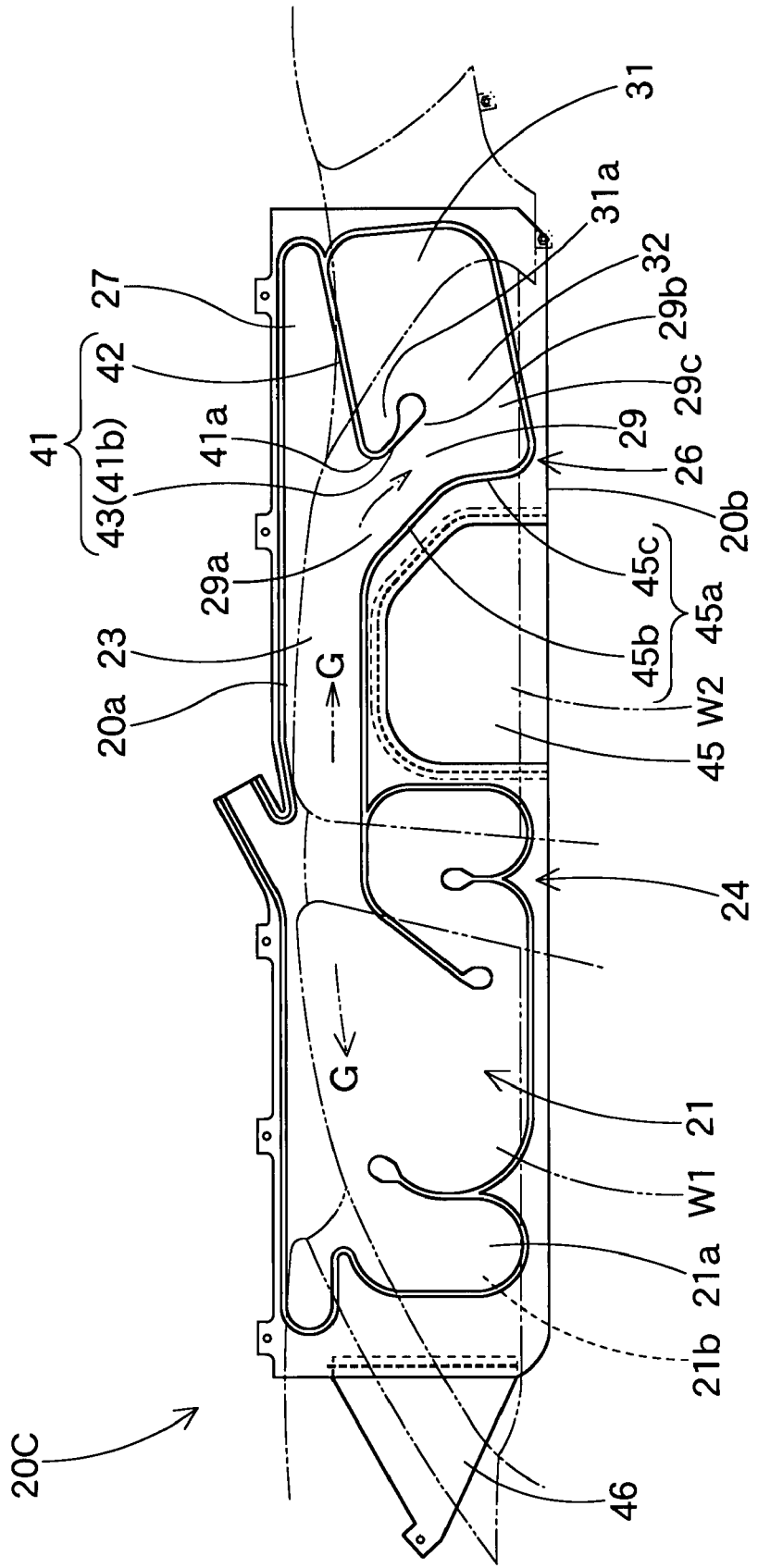
FIG. 22 is a front view of another modification of the airbag of the first embodiment.

The above contour of the lower end 45c of the rear edge 45a of the panel portion 45 at the front edge 26c of the rear inflatable portion 26 may be adopted together with the partitioning portion 41 of the airbag 20 in the first embodiment as in an airbag 20C shown in FIG. 22.

Furthermore, the panel portion 45 of the non-admissive portion 35 disposed in front of the rear inflatable portion 26 may be prepared separately to be joined to the peripheral portion 36 of a hollow-woven component by sewing or the like in a similar manner to the panel portion 46, as in the airbags 20B and 20C shown in FIGS. 20 and 22.

What is claimed is:

1. A head-protecting airbag apparatus comprising:
    an airbag for being folded and housed in an upper periphery of a window inside a vehicle that has a rear pillar and a window adjoining the rear pillar in front of the rear pillar;
    a pillar garnish being provided to cover an interior side of the rear pillar; and
    an airbag cover,
    the airbag pushing and opening the airbag cover and being deployable downward to cover the window when fed with inflation gas,
    the airbag being attachable to a vehicle body at an upper edge thereof,
    the airbag having:
    a rear inflatable portion disposed at a rear area of the airbag, the rear inflatable portion for being housed in the vicinity of an upper area of the rear pillar and arranged to get over an upper end of the pillar garnish when covering the interior side of the rear pillar while pushing and opening the airbag cover, and arranged to deploy to cover interior sides of the rear pillar and the window adjoining the rear pillar in front of the rear pillar at full inflation of the airbag; and
    a gas feed passage arranged along a longitudinal direction of the vehicle at an upper edge of the airbag in front of the rear inflatable portion for supplying inflation gas to a rear region of the airbag,
    the rear inflatable portion comprising:
    an upper side portion extending from the gas feed passage to a rear end of the airbag along the longitudinal direction at an upper edge region of the rear inflatable portion;
    a main body disposed below the upper side portion, the main body being deployed to cover the interior sides of the rear pillar and the window adjoining the rear pillar in front of the rear pillar;
    a partitioning portion extending continuously forward from a rear edge of the airbag for partitioning the upper side portion and the main body; and
    a branched portion disposed in a region from a front edge to a lower edge of the rear inflatable portion and in front of the main body, the branched portion being deployed in front of the rear pillar and below a lower edge of the airbag cover disposed on the upper periphery of the window adjoining the rear pillar in front of the rear pillar at full inflation of the airbag, and the branched portion including an opening for admitting inflation gas flowing downward from the gas feed passage at the front of a front end of the partitioning portion and below a rear end of the gas feed passage,
    the main body is formed to admit inflation gas from an inlet opening disposed at a rear edge of the branched portion, between a front end area of the partitioning portion and a lower edge of the airbag in the lower edge of the rear inflatable portion,
    a whole lower edge, or a part of a front end area of the lower edge, of the upper side portion is located below a parting line between the upper end of the pillar garnish and the lower edge of the airbag cover on a vehicle cabin side before the airbag cover is opened, at full inflation of the airbag, and
    the upper side portion and the gas feed passage are folded and housed at an exterior side of the folded-up main body and branched portion such that the main body is pushed out toward an interior of the vehicle getting over the upper end of the pillar garnish by the upper side portion and the gas feed passage upon airbag deployment.

2. The head-protecting airbag apparatus according to claim 1, wherein the upper side portion of the airbag has a uniform inner diameter generally all along its longitudinal length at full inflation.

3. The head-protecting airbag apparatus according to claim 1, wherein an inner diameter of the upper side portion of the airbag is gradually reduced from a front side toward a rear thereof at full inflation.

4. The head-protecting airbag apparatus according to claim 1, wherein:
    the partitioning portion comprises:
    a transverse portion extending forward from the rear edge of the airbag; and
    a vertical portion extending downward from a front end of the transverse portion and serving as the front end area of the partitioning portion;
    the branched portion is comprised of a region of the rear inflatable portion disposed in front of the vertical portion; and
    the inlet opening of the main body of the rear inflatable portion is formed between a lower end of the vertical portion and the lower edge of the airbag.

5. The head-protecting airbag apparatus according to claim 1, wherein a region of the partitioning portion extending continuously forward from the rear edge of the airbag is formed to be deployed below and along the parting line at full inflation of the airbag.

* * * * *